(12) United States Patent
Ando

(10) Patent No.: US 7,628,138 B2
(45) Date of Patent: Dec. 8, 2009

(54) ENGINE CONTROL APPARATUS AND RELATED ENGINE CONTROL METHOD

(75) Inventor: Katsuyuki Ando, Kasugai (JP)

(73) Assignee: Denso Corporation, Kariya (JP)

( * ) Notice: Subject to any disclaimer, the term of this patent is extended or adjusted under 35 U.S.C. 154(b) by 438 days.

(21) Appl. No.: 11/785,818

(22) Filed: Apr. 20, 2007

(65) Prior Publication Data

US 2007/0246012 A1   Oct. 25, 2007

(30) Foreign Application Priority Data

Apr. 24, 2006   (JP) .............................. 2006-119710

(51) Int. Cl.
F02D 45/00 (2006.01)
F02D 41/06 (2006.01)

(52) U.S. Cl. .............................. 123/406.13; 123/179.3

(58) Field of Classification Search ............ 123/406.13, 123/406.47, 406.62, 179.3, 179.4, 179.5
See application file for complete search history.

(56) References Cited

U.S. PATENT DOCUMENTS

| | | | | |
|---|---|---|---|---|
| 5,156,125 A | * | 10/1992 | Fukui et al. ............. | 123/406.62 |
| 5,269,274 A | * | 12/1993 | Flaetgen et al. ......... | 123/406.62 |
| 5,394,857 A | * | 3/1995 | Yamakawa ................... | 123/686 |
| 5,460,134 A | * | 10/1995 | Ott et al. ..................... | 123/476 |
| 5,584,274 A | * | 12/1996 | Fukui et al. ............. | 123/406.18 |
| 5,630,396 A | * | 5/1997 | Fukui et al. ............. | 123/406.18 |
| 5,632,246 A | * | 5/1997 | Fukui et al. ............. | 123/406.18 |
| 5,671,145 A | * | 9/1997 | Krebs et al. ............ | 123/406.62 |
| 5,671,714 A | | 9/1997 | Fukui et al. | |
| 5,699,771 A | * | 12/1997 | Tanabe ....................... | 123/479 |
| 6,016,789 A | * | 1/2000 | Denz et al. ............. | 123/406.62 |
| 6,035,826 A | * | 3/2000 | Matsuoka ............... | 123/406.62 |
| 6,302,085 B1 | * | 10/2001 | Sekine et al. .......... | 123/406.62 |
| 6,341,253 B1 | * | 1/2002 | Honda .................... | 123/406.62 |
| 6,775,611 B2 | | 8/2004 | Kobayashi et al. | |
| 6,805,096 B2 | | 10/2004 | Iizuka | |
| 6,895,931 B2 | * | 5/2005 | Rupp et al. ............. | 123/406.18 |
| 7,013,719 B2 | * | 3/2006 | Adachi et al. ............ | 73/114.27 |
| 7,142,973 B2 | * | 11/2006 | Ando ....................... | 123/179.4 |
| 7,197,391 B2 | * | 3/2007 | Kunibe et al. .......... | 123/406.18 |
| 2002/0157641 A1 | | 10/2002 | Sakakibara | |

(Continued)

FOREIGN PATENT DOCUMENTS

EP   1 338 779   8/2003

(Continued)

*Primary Examiner*—Stephen K Cronin
*Assistant Examiner*—Arnold Castro
(74) *Attorney, Agent, or Firm*—Nixon & Vanderhye, PC

(57) ABSTRACT

An engine control apparatus and related control method for an engine are disclosed wherein cylinder discrimination is executed based on a crank signal and a cam signal under a normal signal mode. If a failure occurs in either the crank signal or the cam signal, the cylinder discrimination is executed based on a normal one of the crank signal and the cam signal. A starter device is driven to crank up the engine until judgment is made that the engine enters a running state. A duration time for the starter device to be driven is measured and if the duration time reaches a limit time, the driving state of the starter device is interrupted. When either the crank signal or the cam signal encounters the failure, the limit time is set to a longer time than a preset time for the normal signal mode.

15 Claims, 11 Drawing Sheets

U.S. PATENT DOCUMENTS

| | | | |
|---|---|---|---|
| 2004/0194749 A1* | 10/2004 | Yonezawa et al. | 123/179.5 |
| 2004/0206333 A1* | 10/2004 | Makino et al. | 123/406.59 |
| 2005/0160803 A1* | 7/2005 | Adachi et al. | 73/117.3 |
| 2005/0278109 A1* | 12/2005 | Ando | 701/112 |

FOREIGN PATENT DOCUMENTS

| | | |
|---|---|---|
| EP | 1 548 274 | 6/2005 |
| JP | 11-82263 | 3/1999 |
| JP | 2002-221132 | 8/2002 |
| JP | 2003-003902 | 1/2003 |
| JP | 2003003902 A * | 1/2003 |
| JP | 2003-049696 | 2/2003 |
| JP | 2003-254147 | 9/2003 |

* cited by examiner

ENGINE CONTROL APPARATUS AND RELATED ENGINE CONTROL METHOD

CROSS REFERENCE TO RELATED APPLICATIONS

This application is related to Japanese Patent Application No. No. 2006-119710, filed on Apr. 24, 2006, the content of which is hereby incorporated by reference.

BACKGROUND OF THE INVENTION

1. Technical Field of the Invention

The present invention relates to engine control apparatuses for vehicles and, more particularly, to an engine control apparatus and a related engine control method for controlling autostart (automatic startup) of an engine of a vehicle.

2. Description of the Related Art

In the related art, attempts have heretofore been made to provide engine control apparatuses for controlling startups of multi-cylinder engines installed on vehicles as disclosed in, for instance, Japanese Patent Application Publication No. 2003-254147 (Patent Publication 1) and Japanese Patent Application Publication No. 2003-49696 (Patent Publication 2).

Each of these multi-cylinder engines generally includes a crank sensor associated with a crankshaft to output a crank signal indicative of a rotational speed of the crankshaft and a cam sensor associated with a camshaft to output a cam signal indicative of a rotational speed of the camshaft. The engine control apparatus executes cylinder discrimination in response to the crank signal and the cam signal in combination to provide a cylinder discriminating result, based on which fuel injection and ignition are performed for each cylinder thereby causing the engine to operation. As used herein, the term "cylinder discrimination" refers to a phase wherein a rotary position of the crankshaft for one cycle (720° CA) of the engine is specified.

Further, a failure tends to occur in either the crank signal or the cam signal with no variation in signal level due to the disconnection of a sensor signal line or short-circuiting to a specified voltage potential. Under such occasion, cylinder discrimination is performed using a normal one of the crank signal and the cam signal to render the engine operative in technology disclosed in, for instance, Patent Publication 1.

Meanwhile, in recent years, the engine control apparatus of such a kind usually includes, for instance, a push-button type starter switch and is operative to authenticate a correct user of a vehicle. The authentication results in success when the push-button type starter switch is turned and a communication is established with a portable device carried by the user of the vehicle. Thus, the authentication means judgment made that the user is a right user.

An attempt has heretofore been undertaken to provide an autostart (automatic start) control device. Autostart control is performed upon the establishment of a startup initiating condition in receipt of the relevant authentication result. This automatically drives a starter motor to crank up the engine until judgment is made that the engine enters a running state (in complete combustion) as disclosed in, for instance, Japanese Patent Application Publication No. 2002-221132 (Patent Publication 3).

With a system carrying out autostart control of such a kind, in comparison to a manual type startup system wherein a starter motor is driven for a time period in which a user turns on a starter switch, the user has no need to continue the operation for startup of the engine until the engine reaches complete combustion. This results in an advantageous effect of enabling the improving productivity of the vehicle and no probability of driving the starter motor in an unwanted occasion such as the running of the engine.

Further, the engine control apparatus, performing the autostart control of this kind, is configured to drive the starter motor for a driving duration time provided with a limit time (drive enabling time for starter motor) (see, for instance, Patent Publication 3). That is, with the driving duration time reaching the limit time, the drive of the starter motor is interrupted due to a limiting function resulting from the limit time even if the engine does not enter the running state. This prevents the starter motor from being unnecessarily and continuously driven due to some failure in input conditions. In addition, this prevents the occurrence of battery dead or deterioration in battery due to the starter motor being driven for an extended period of time.

Meanwhile, under a situation where a failure occurs in either the crank signal or the cam signal and the cylinder discrimination is performed using only a normal signal, the engine control apparatus has less information for cylinder discrimination than that in which all the signals are normal. Therefore, this results in a long maximum time from timing at which the cranking of the engine begins, due to the starter motor being driven, to timing at which the cylinder discrimination is completed. Thus, when an attempt is made to start up the engine under a circumstance where some of the crank signal and the cam signal is not normally input, the maximum time for the starter motor to begin in operation to cause the engine to enter the running state becomes longer than that occurring in a normal mode.

Therefore, with the engine control apparatus performing the autostart control, if a failure occurs in some of the crank signal and the cam signal, the driving duration time of the starter motor reaches the limit time before the engine enters the running state after the motor has begun to be driven. When this takes place, the driving of the starter motor is interrupted, causing a probability with a difficulty of starting up the engine. Especially, under extremely cold environments, a drop occurs in battery voltage and a viscosity of lubricating oil increases. This causes a further increase to occur in time for the starter motor to begin in operation to complete the cylinder discrimination, resulting in a further increase in a probability for the startup of the engine to be disabled.

SUMMARY OF THE INVENTION

The present invention has been completed with a view to addressing the above issues and has an object to provide an engine control apparatus and a related engine control method for performing autostart control for an engine of a vehicle that can reliably start up the engine even in the occurrence of a failure in either a crank signal or a cam signal with no input signal being normally applied.

To achieve the above object, a first aspect of the present invention provides an engine control apparatus for a multi-cylinder engine, installed on a vehicle, which has a crank sensor for detecting rotation of a crankshaft of the engine to output a crank signal depending on the rotation of the crankshaft, and a cam sensor for detecting rotation of a camshaft to output a cam signal depending on the rotation of the camshaft. The engine control apparatus comprises first cylinder discriminating means for executing cylinder discrimination based on the crank signal and the cam signal under a normal signal mode.

Further, failure detecting means is provided for detecting failures in the crank signal and the cam signal, respectively.

Second cylinder discriminating means executes the cylinder discrimination, in place of the first cylinder discriminating means based on the crank signal and the cam signal under the normal signal mode, in the presence of the failure in either the crank signal or the cam signal.

The engine control apparatus is operative to initiate fuel injection and ignition in each cylinder of the engine based on the cylinder discrimination executed by one of the first and second cylinder discriminating means.

The engine control apparatus further comprises automatic startup control means and drive time limiting means. The automatic startup control means cranks the engine upon driving a starter device until judgment is made that the engine enters a running state in the presence of judgment that a specified startup initiating condition is established. The drive time limiting means interrupts the automatic startup control means from driving the starter device when a duration time for the automatic startup control means to drive the starter device is measured upon which judgment is made that the duration time reaches a limit time.

Therefore, during a normal mode in which the crank signal and the cam signal are normally input, if the startup initiating condition is established, the automatic startup control means drives the starter for commencing the cranking. Then, the first cylinder discriminating means performs the cylinder discrimination based on the crank signal and the cam signal. In this moment, if the cylinder discrimination is completed, before the limit time elapses after the beginning of the starter device being driven, and fuel injection and ignition are initiated based on the cylinder discriminating result to cause the engine to enter a running state (in complete combustion), the automatic startup control means stops the driving of the starter device.

Further, under a circumstance where when either one of the crank signal and the cam signal is not normally input in the presence of a failure, the startup initiating condition is established and the automatic startup control means drives the starter device, even if the engine is cranked up, either the crank signal or the cam signal is not normally input. Thus, such a failure is detected by the failure detecting means.

In such a case, the second cylinder discriminating means executes the cylinder discrimination based on a signal, whose failure is not detected, of the crank signal and the cam signal. Thus, fuel injection and ignition are initiated based on a resulting cylinder discriminating result. During such operations, if the either the crank signal or the cam signal encounters a failure, the engine control apparatus has a less amount of information for performing the cylinder discrimination. Therefore, the maximum time, required in a phase from beginning the driving of the starter device to the completion of the cylinder discrimination, becomes longer than that required during a normal mode in the absence of the failure in the crank signal and the cam signal. This leads to an increase in the maximum time for the engine to enter the running state. Therefore, there is a fear of the driving duration time for the starter device reaching the limit time to be judged by the drive time limiting means, causing the driving of the starter device to be forcibly interrupted.

To address such a fear, the engine control apparatus comprises limit time setting means for setting the limit time to a longer time than a preset time for the normal signal mode when the failure detecting means detects the failure in either the crank signal or the cam signal.

Thus, the engine control apparatus of such a structure can address various issues encountered in the related art. That is, under a circumstance where any of the crank signal and the cam signal encounters a failure and is not normally input, the operation is executed to reliably avoid the drive time limiting means from forcibly interrupting the driving of the starter device before the engine enters the running state. This allows the engine to reliably start up.

Thus, when the failure detecting means detects the failure in either the crank signal or the cam signal, the value of the limit time to be set by the limit time setting means may suffice to have a longer time than Ts as described below.

That is, the term "Ts" refers to a time for which, in the presence of the failure in either the crank signal or the cam signal, the starter device begins to crank the engine and the second cylinder discriminating, means completes executing the cylinder discrimination to provide a cylinder discriminating result based on which the fuel injection and the ignition are initiated to cause the engine to enter the running state. The limit time setting means may suffice to set the limit time to be longer than Ts in the presence of the failure in either the crank signal or the cam signal.

With the engine control apparatus of such a structure, the limit time setting means may be operative to set the limit time to a predetermined initial value until either the first cylinder discriminating means or the second cylinder discriminating means completes the execution of the cylinder discrimination after which when the first cylinder discriminating means and the second cylinder discriminating means complete the execution of the cylinder discrimination, the limit time setting means freshens the limit time to be set to a first time for a normal signal mode to be shorter than the initial value in the absence of the failure in either the crank signal or the cam signal and freshens the limit time to be set to a second time for a failure signal mode to be shorter than the initial value but to be longer than the first time for the normal signal mode, in the presence of the failure in either the crank signal or the cam signal.

That is, with the engine control apparatus of such a structure, the limit time is set to the predetermined initial value until the cylinder discrimination is completed, after which the limit time freshens to be set to the first time to be shorter than the initial value.

With such a structure, the limit time can be reliably set to the first time for the normal signal mode in the absence of the failure in either the crank signal or the cam signal and the second time for the failure signal mode in the presence of the failure in either the crank signal or the cam signal. This is because the detection result of the failure detecting means is affirmed at timing when the cylinder discrimination is completed and, at that timing, the limit time freshens to be set to a desired time.

With the engine control apparatus mentioned above, the limit time setting means may be operative to set the limit time to a time, which is equal to a value in which a given value is added to a setting time for a normal mode, or a time in which the setting time for the normal mode is made longer by a given rate.

With the engine control apparatus mentioned above, the limit time setting means may be operative to detect specified information related to startability of the engine from among information relevant to the vehicle and set the limit time depending on a detection value on the specified information such that the lower the startability of the engine represented by the detection value, that is, the harder the engine to be started, the longer will be the limit time. This allows the limit time to be set to an optimum value (not to be too long or not to be too short) at all times, providing increased reliability of starting up the engine.

With the engine control apparatus mentioned above, the specified information may have at least one of a battery voltage of the vehicle, an ambient temperature around the vehicle, a coolant water temperature of the engine and a temperature of lubricating oil of the engine. The ambient temperature around the vehicle may be conceivably detected with a temperature sensor (a so-called ambient temperature sensor) mounted on the vehicle in an area exposed to atmospheric air. For instance, the temperature sensor may be located in an area near an air intake system to detect temperatures of intake air being supplied to the engine as a temperature around the vehicle.

If specified information includes the battery voltage, the limit time may be set such that the lower the battery voltage, the longer will be the time. In addition, if specified information includes at least one of the temperature around the vehicle, the coolant water temperature and the temperature of lubricating oil, the limit time may be set such that the lower the temperature, the longer will be the time.

A second aspect of the present invention provides an engine control apparatus for a multi-cylinder engine, installed on a vehicle, which has a crank sensor for detecting rotation of a crankshaft of the engine to output a crank signal depending on the rotation of the crankshaft, and a cam sensor for detecting rotation of a camshaft to output a cam signal depending on the rotation of the camshaft. The engine control apparatus comprises first cylinder discriminating means for executing cylinder discrimination based on the crank signal -and the cam signal under a normal signal mode, failure detecting means for detecting failures in the crank signal and the cam signal, respectively, and second cylinder discriminating means for executing the cylinder discrimination, in place of the first cylinder discriminating means based on the crank signal and the cam signal under the normal signal mode, in the presence of the failure in either the crank signal or the cam signal. The engine control apparatus causes fuel injection and ignition to be initiated for each cylinder of the engine based on the cylinder discrimination executed by either the first cylinder discriminating means or the second cylinder discriminating means. Automatic startup control means cranks up the engine upon driving a starter device until judgment is made that the engine enters a running state in the presence of judgment made that a specified startup initiating condition is established. Drive time limiting means interrupts the automatic startup control means from driving the starter device when a duration time for the automatic startup control means to drive the starter device is measured upon which judgment is made that the duration time reaches a limit time.

With the engine control apparatus of such a structure, assume that a time for the starter device begins to be driven and the second cylinder discriminating means to complete the cylinder discrimination to cause the fuel injection and ignition to be initiated based on a relevant cylinder discriminating result to cause the engine to enter the running state when either the crank signal or the cam signal encounters a failure is Ts, the limit time (limit time for which the starter device is driven) is set to be longer than Ts in the presence of the failure in either the crank signal or the cam signal.

Therefore, even such an engine control apparatus makes it possible to reliably avoid the driving of the starter device from being forcibly interrupted before the engine enters the running state in the presence of the failure in either the crank signal or the cam signal. This enables the engine to reliably start up.

The engine control apparatus may further comprise limit time calculating means that calculates a value of the limit time based on specified information related to startability of the engine from among information relevant to information of the vehicle. In addition, failure startup required time calculating means may calculate a value of Ts based on the specified information.

Further, setting means may be operative to allow comparison to be made between a calculated value of the limit time calculating means and a calculated value of the failure startup required time calculating means. In the presence of the calculated value of the limit time calculating means larger than the calculated value of the failure startup required time calculating means, the setting means sets the limit time to be the calculated value of the limit time calculating means. In the absence of the calculated value of the limit time calculating means larger than the calculated value of the failure startup required time calculating means, the setting means sets the limit time to be longer than the calculated value of the failure startup required time calculating means.

With such an arrangement of the engine control apparatus, the operations are executed to reliably set the limit time depending on specified information relevant to startability of the engine while setting the limit time to be longer than Ts.

Due to a capability of setting the limit time depending on specified information relevant to startability of the engine, the structure including the limit time calculating means may further include the failure mode startup required time calculating means and the setting means. Such a structure enables a condition to be established as "limit time>Ts". That is, the engine control apparatus of the second aspect of the present invention can be easily applied to a structure that includes the limit time calculating means whose calculated value is set to be the limit time.

Specified information related to startability of the engine may have at least one of a battery voltage of the vehicle, an ambient temperature around the vehicle, a coolant water temperature of the engine and a temperature of lubricating oil of the engine. The ambient temperature around the vehicle may be detected with a temperature sensor (ambient temperature sensor) mounted on the vehicle in an area exposed to atmospheric air. The ambient temperature sensor may be located in an air intake system of the engine so as to detect temperatures of intake air being sucked into the engine as ambient temperatures around the vehicle.

With specified information including the battery voltage, the limit time calculating means calculates a value of the limit time such that the lower the battery voltage, the longer will be the limit time. Likewise, the failure startup required time calculating means calculates a value of Ts such that the lower the battery voltage, the greater will be Ts. Further, with specified information including at least one of the ambient temperature around the vehicle, the coolant water temperature of the engine and the temperature of lubricating oil of the engine, the limit time calculating means calculates a value of the limit time such that the lower the temperature, the longer will be the limit time. Likewise, the failure startup required time calculating means calculates a value of Ts such that the lower the temperature, the greater will be Ts.

A third aspect of the present invention provides a method of controlling a startup of a multi-cylinder engine, installed on a vehicle, which has a crank sensor for detecting rotation of a crankshaft of the engine, and a cam sensor for detecting rotation of a camshaft. The method comprises receiving a crank signal from the crank sensor representing the rotation of the crankshaft, receiving a cam signal from the cam sensor representing the rotation of the camshaft, executing cylinder discrimination based on the crank signal and the cam signal under a normal signal mode, detecting failures in the crank signal and the cam signal, respectively, and discriminating whether or not a specified startup initiating condition is established for the engine. The method further comprises interrupting the cylinder discrimination from being executed based on the crank signal and the cam signal in the presence of the failure in either the crank signal or the cam signal while executing the cylinder discrimination based on a normal one of the crank signal and the cam signal, performing automatic startup control for cranking up the engine in the presence of the specified startup initiating condition by driving a starter device until the engine enters a running state, measuring a duration time for which the automatic startup control is executed to drive the starter device and making judgment whether or not the duration time reaches a limit time, interrupting the automatic startup control to prevent the starter device from being driven in the presence of the judgment that the duration time reaches the limit time, and setting the limit time to be longer than a preset reference time, assigned to a normal mode, in the presence of the failure in either the crank signal or the cam signal. Fuel injection and ignition are executed for each cylinder of the engine based on the cylinder discrimination.

With the method of the third aspect of the present invention, the cylinder discrimination is executed based on the crank signal and the cam signal and failures in the crank signal and the cam signal are detected, respectively. Then, the operation is executed for discriminating whether or not a specified startup initiating condition is established for the engine.

Under such a condition, the cylinder discrimination is interrupted from being executed based on the crank signal and the cam signal in the presence of the failure in either the crank signal or the cam signal. In this moment, the cylinder discrimination is executed based on a normal one of the crank signal and the cam signal and automatic startup control is executed for cranking up the engine in the presence of the specified startup initiating condition by driving a starter device until the engine enters a running state.

The duration time for which the automatic startup control is executed to drive the starter device is measured and judgment is made whether or not the duration time reaches a limit time. The automatic startup control is interrupted to prevent the starter device from being driven in the presence of the judgment that the duration time reaches the limit time. The limit time is set to be longer than a preset reference time, assigned to a normal mode, in the presence of the failure in either the crank signal or the cam signal.

Fuel injection and ignition are executed for each cylinder of the engine based on the cylinder discrimination. Thus, under a circumstance where any of the crank signal and the cam signal encounters a failure and is not normally input, the operation is executed to reliably avoid the drive time limiting means from forcibly interrupting the driving of the starter device before the engine enters the running state.

This allows the engine to reliably start up. Moreover, when the failure detecting means detects the failure in either the crank signal or the cam signal, the value of the limit time to be set by the limit time setting means may suffice to have a longer time than the reference time as set forth above. This results in a further increase in reliability in starting up the engine. Accordingly, no battery death or deterioration of the battery takes place in the vehicle when controlled with the method of the present invention mentioned above.

DETAILED DESCRIPTION OF PREFERRED EMBODIMENTS

Now, engine control apparatuses for vehicle of various embodiments according to the present invention and methods of controlling a startup of an engine of a vehicle will be described below in detail with reference to the accompanying drawings. However, the present invention is construed not to be limited to such engine control apparatuses and the engine control methods described below and technical concepts of the present invention may be implemented in combination with other known technologies or other technologies having required functions equivalent to such known technologies.

Now, an engine control unit (hereinafter referred to "engine ECU". or "ECU" in a simple expression) forming an engine control apparatus of an embodiment according to the present invention will be described below in detail with reference to the accompanying drawings.

First Embodiment

Figure 1:
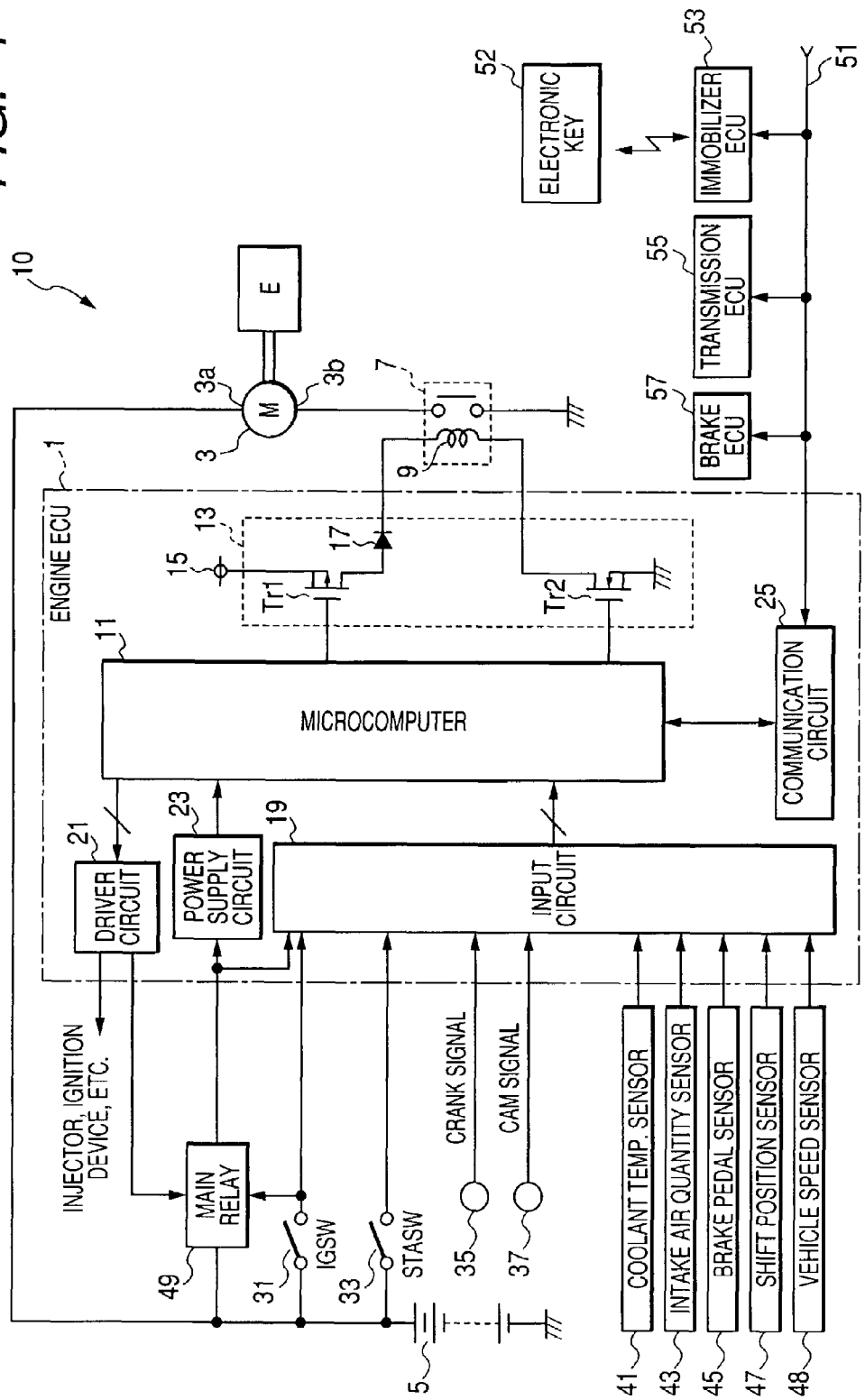
FIG. 1 is a block diagram showing an engine control apparatus for vehicle of a first embodiment according to the present invention.

FIG. 1 is a block diagram showing a structural view of an engine control apparatus 10 of the present embodiment including an engine ECU1 and associated peripheral units. In the illustrated embodiment, the engine ECU1 serves to control a multi-cylinder engine (a six-cylinder engine in the illustrated embodiment) installed on a vehicle. That is, the engine ECU1 performs operations for controlling fuel injection and ignition for each cylinder while additionally performing autostart control to start up the engine upon one-touch operation.

As shown in FIG. 1, the engine control apparatus 10 includes a starter motor 3 located outside the engine ECU 1 for cranking up a multi-cylinder engine E for startup thereof. The starter motor 3 has a positive terminal 3a connected to a positive terminal of an on-vehicle battery 5 at all times. The starter motor 3 also has a negative terminal 3b connected through a contact of a starter relay 7 to a ground line at "0" volt to which a negative terminal of the battery 5 is also grounded. The starter relay 7 has a coil 9 whose both terminals are connected to the engine ECU1 to be controlled in a manner as will be described below.

Meanwhile, the ECU1 includes a microcomputer 11, operative to execute various processing for control the engine while outputting a starter relay drive signal, and a starter relay driver circuit 13 operative to turn on the starter relay 7 upon conducting the coil 9 in response to the starter relay drive signal delivered from the microcomputer 11.

The starter relay driver circuit 13 includes a high-side transistor Tr1, composed of a P-channel MOSFET, and a low-side transistor Tr2 composed of an N-channel MOSFET. The high-side transistor Tr1 has a source, connected to a power supply line 15 to which a positive voltage (battery voltage) is supplied from the positive terminal of the battery 5, a drain to which an anode is connected, and a cathode which is connected to one end of the coil 9 through a diode 17 for preventing flyback current. The low-side transistor Tr2 has a drain, connected to the other end of the coil 9, and a source connected to the ground line.

With the starter relay driver circuit 13, further, as the starter relay drive signal delivered from the microcomputer 11 takes an active level, the two transistors Tr1, Tr2 are turned on. These cause electric current to flow through the coil 9 of the starter relay 7. Then, the starter relay 7 is turned on, that is, the contacts of the starter relay 7 are closed. This allows electric power to be supplied to the starter motor 3 from the battery 5, causing the starter motor 3 to operate thereby cranking up the engine E.

Further, the ECU 1 includes an input circuit 19 serving as an interface for various input signals to be input to the microcomputer 11 from external signal sources for controlling the engine E.

More particularly, the microcomputer 11 is applied through the input circuit 19 with an ignition switch signal representing an ON/OFF state of an ignition switch (IGSW) 31 of a vehicle, a starter switch signal representing an ON/OFF state of a starter switch (STASW) 33, a crank signal output from a crank sensor 35 depending on the rotation of an engine crank shaft, and a cam signal output from a cam sensor 37 depending on the rotation of a camshaft for actuating a valve of the engine. The microcomputer 11 is further applied with a water temperature signal output from a coolant temperature sensor 41 detecting temperatures of cooling water (temperatures of coolant) of the engine, an air intake quantity signal output from an air intake quantity sensor 43 mounted on the engine in an air intake passage thereof, a brake pedal displacement signal output from a brake pedal sensor 45 operative to detect operating displacements of a brake pedal operated by a vehicle driver, a shift position signal output from a shift position sensor 47 operative to detect a gear position (shifting position) of an automatic power transmission, a vehicle speed signal output from a vehicle speed sensor 48, etc.

While the input circuit 19 is shown FIG. 1 in one unit in connection with the ECU 1 of the present embodiment, it will be appreciated that the input circuit 19 may include discrete input units for respective input signals to be input to the microcomputer 11 to execute processing of the respective input signals depending on a kind thereof. For instance, with the input signals including the crank signal, the cam signal and the switch signals, these signals are subjected to waveform shaping into square waves each with binary levels, which in turn are input as the input signals to the microcomputer 11. With the input signals including analog signals such as the water temperature signal and the air intake quantity signal, delivered from the water temperature sensor 41 and the air intake quantity sensor 43 in the form of analogue signals, these signals are processed to remove harmonic noises and supplied to input ports of A/D converters of the microcomputer 11.

Now, the crank signal delivered from the crank sensor 35 and the cam signal delivered from the cam sensor 37, to be used for the engine control apparatus 10 of the present embodiment, will be described below in detail.

First, the crankshaft of the engine coaxially carries thereon a disc-like crank pulsar whose outer periphery is formed with a plurality of radially extending protrusions formed at predetermined rotation angle intervals of the crankshaft 10, that is, at intervals of 15° CA with the present embodiment. Among the plurality of protrusions, one protrusion is removed out of the outer periphery of the crank pulsar for each of positions in the vicinity of top dead centers (TDCs) of particular cylinders, that is, for instance, a first cylinder (#1) and a sixth cylinder (#6). The removed tooth portion takes the form of a so-called lacked tooth portion. Accordingly, this results in the crank pulsar having a total of 23 protrusions.

An electromagnetic pickup coil is disposed in a position adjacent to the outer periphery of the crank pulsar. The electromagnetic pickup coil generates a pulse signal each time the protrusion passes across the electromagnetic pickup coil. Thus, the crank pulsar and the electromagnetic pickup coil constitute the crank sensor 35.

A camshaft rotates in synchronism with the crankshaft of the engine and makes one rotation during which the crankshaft rotates twice. A disc-like cam pulsar is fixedly mounted on the camshaft. The cam pulsar has an outer periphery formed with a plurality of protrusions at equidistantly spaced intervals for the number of cylinders. With engine control apparatus 10 of the present embodiment, the cam pulsar is configured to have a structure for an exemplified six-cylinder engine. Therefore, the protrusions are formed on an outer periphery of the cam pulsar at every 60 degrees, that is, 120° CA of crank angle. For example, each of the protrusions is formed on a position 45° CA before TDC of each cylinder of the engine. In addition, the outer periphery of the cam pulsar is formed with an extra tooth just before the protrusion corresponding to TDC of the first cylinder. With the present embodiment, the extra tooth is formed on a position 75° CA before TDC of the first cylinder.

An electromagnetic pickup coil is disposed adjacent to the outer periphery of the cam pulsar. The electromagnetic pickup coil generates pulse signals each time the protrusions and the auxiliary tooth pass across the pickup coil. Thus, the cam pulsar and the electromagnetic pickup coil constitute the cam sensor 37.

Figure 2:
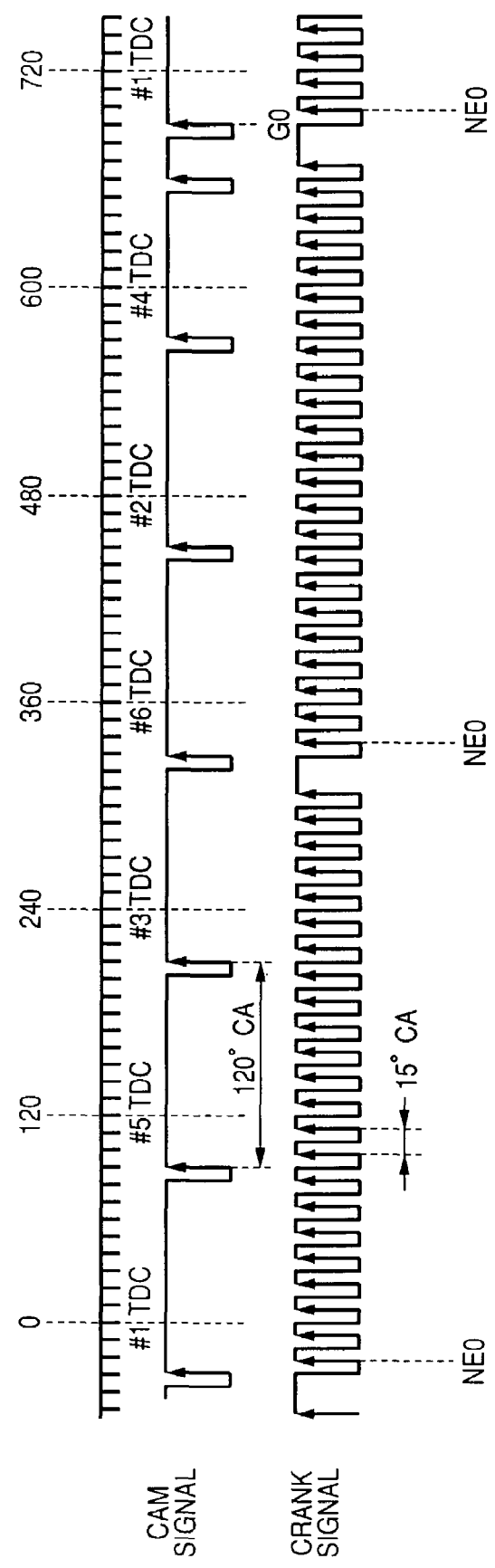
FIG. 2 is a timing chart showing a cam signal and a crank signal with their waveforms being shaped.

FIG. 2 is a timing chart showing signal waveforms of the crank signal and the cam signal with the waveforms being shaped. In FIG. 2, a firing order for the cylinders is indicated as 1-5-3-6-2-4. Therefore, the TDC of the first cylinder #1TDC and the TDC of the sixth cylinder #6TDC are separate from each other by 360° CA in a two-faced relationship.

The cam signal is composed of a train of pulses at 15° CA intervals. In the illustrated embodiment, a lack of tooth on the crank pulsar results in a lack of one pulse and an interval between effective edges, that is, rising edges in the illustrated embodiment are doubled. The signal at which the pulse is absent is referred to as a "lacked tooth". In this case, when the lacked tooth corresponding to the #1TDC is assumed to be a "front side lacked tooth", the other lacked tooth corresponding to the #6TDC is assumed to be a "backside lacked tooth".

In general, further, the detection of such a lacked tooth in the crank signal is referred to as "lacked tooth detection" and may be executed in, for instance, a sequence described below.

That is, for a method of detecting the lacked tooth, a time interval between the adjacent effective rising edges is measured each time the effective edges appear in the crank signal. Upon finding that a current measured value is greater than a preceding measured value times a given number (>1), then, judgment is made that the current effective edge indicates an end of the lacked tooth to represent an ending edge of the lacked tooth which is shown as NE0 in FIG. 2.

With the signal waveform shown in FIG. 2, the ending edges NE0 appear at timings on 22.5° CA before the #1TDC and 22.5° CA before the #6TDC.

Meanwhile, the cam signal is composed of a train of pulses with 120° CA intervals and includes an extra tooth pulse corresponding to the extra tooth set forth above to play a role as an auxiliary tooth pulse. In the illustrated example shown in FIG. 2, the extra tooth pulse appears just before a cam pulse, corresponding to the #1TDC, which is shown as G0 in FIG. 2. The auxiliary tooth pulse appears once within 720° CA.

In the illustrated example shown in FIG. 2, the cam signal has pulses with effective edges (rising edges in the illustrated embodiment) appearing with 120° CA interval. In addition, an effective edge of the extra tooth pulse appears at timing of 60° CA before the #1TDC.

Therefore, during the operation to detect the lacked tooth in the crank signal, that is, during the operation to detect the rising edge NE0, the discrimination is made to find whether or not the auxiliary tooth pulse (extra tooth pulse) appears for a predetermined period covering the latest predetermined crank angle, e.g., 60° CA before NE0 in FIG. 2. This makes it possible to determine whether the current lacked tooth is of the #1TDC representing the front side lacked tooth or of the #6TDC representing the backside lacked tooth. Thus, the crank signal enables a particular cylinder to be discriminated.

For a concrete method of discriminating the cylinder, if the effective edges appear in the cam signal twice for the period of the latest predetermined crank angle when the ending edge NE0 of the lacked tooth in the crank signal is detected, then, judgment is made that the current lacked tooth is the lacked tooth (front side lacked tooth) of the #1TDC. In this case, a current rotary position of the crankshaft (hereinafter referred to as a "crank position") can be specified to be 22.5° CA before the #1TDC.

Further, if the effective edge appears in the cam signal once for the period of the latest predetermined crank angle when the ending edge NE0 of the lacked tooth in the crank signal is detected, then, judgment is made that the current lacked tooth is the lacked tooth (backside lacked tooth) of the #6TDC. In this case, a current rotary position of the crankshaft can be specified to be 22.5° CA before the #6TDC.

Meanwhile, with the engine control apparatus 10 of the present embodiment, the starter switch 33 is of a push button type switch that is turned on only when remains under a depressed position.

Further, the ECU 1 comprises a driver circuit 21 configured to actuate various actuators such as a fuel injector (fuel injection valve) and an ignition device or the like, except for the starter relay 7, in response to control signals output from the microcomputer 11, and a power supply circuit 23. The power supply circuit 23 is connected to the battery 5 through a main relay 49, described below, which is supplied with battery voltage to generate fixed power supply voltage at, for instance, 5V for actuating the microcomputer 11. In addition, a communication circuit 25 is connected to the microcomputer 11 for communication with other on-vehicle ECUs via a communication line 51 for LAN disposed inside the vehicle.

Although not shown in the drawing, the injector and the ignition device are mounted on each of the cylinders of the engine. In addition, the driver circuit 21 is present for each of the actuators in actual practice. In the illustrated embodiment, moreover, although the on-vehicle ECUs will be described with reference to an exemplary case of performing communication via the communication line 51 on communication Protocol composed of "CAN" (Controller Area Network), the present invention is not limited to such an exemplary case.

The main relay 49 is provided outside the microcomputer 11 for supply of electric power thereto. As the ignition switch 31 is turned on, the main relay 49 is also turned on to allow battery voltage to be supplied to the power supply circuit 23 of the ECU 1. Then, with the ECU 1, the power supply circuit 23 supplies the microcomputer 11 with power supply voltage on the basis of battery voltage delivered through the main relay 49. In addition, the microcomputer 11 is configured to turn on or turn off the main relay 49 by means of the driver circuit 21. As the main relay 49 turned on with the ignition switch 31 being turned on, the microcomputer 11 begins to execute processing. Then, the microcomputer 11 per se turns on the main relay 49 such that even when the ignition switch 31 is released, the main relay 49 continuously remains under operation while, upon termination of overall required processing, turning off the main relay 49 to stop the operation thereof.

Further, upon receipt of battery voltage from the main relay 49, the ECU 1 allows battery voltage to be supplied to an input port of an A/D converter of the microcomputer 11 via the input circuit 19. Thus, the microcomputer 11 can perform A/D conversion of input voltage applied to the input port, enabling battery voltage to be detected.

Meanwhile, the electronic control apparatus 10 further comprises, in addition to the ECU 1, the ECUs including an immobilizer ECU 53 performing wireless communication with an electronic key 52 playing a role as a portable unit available to be carried with a vehicle occupant, a transmission ECU 55 operative to control an automatic power transmission of the vehicle, and a brake ECU 57 for controlling a brake of the vehicle. The respective ECUs 1, 53, 55, 57 are connected to each other through a communication line 51 to perform communication with each other for is exchanging information to control respective control objects.

The brake pedal detection signal output from the brake pedal sensor 45, the shift position detection signal output from the shift position sensor 47 and the vehicle speed detection signal output from the vehicle speed sensor 48 are input to, in addition to the ECU 1, the other ECUs such as the transmission ECU 55 and the brake ECU 57. Thus, the ECU 1 can receive input information, delivered from the other ECUs connected to the communication line 51, which include information indicative of whether or not the brake pedal is actuated, information on the displacement value of the brake pedal, information on the gear position of the automatic power transmission and information on the vehicle speed.

Further, the immobilizer 53 is configured to transmit a request signal to an area close proximity to a driver's seat in a vehicle compartment to request the electronic key 52 for sending an ID when a condition, conceived for a person getting in the driver's seat, is established, that is, when, for instance, a door lock of the vehicle is released to cause a door near the driver seat varies in sequence "CLOSE-OPEN-CLOSE". The electronic key 52, carried by the person (that is, a vehicle occupant who wants to drive the vehicle) taking on the driver's seat, receives the request signal and transmits an own ID. Then, the immobilizer 53 receives the own ID delivered from the electronic key 52 and makes comparison between the received ID and the ID (that is, an ID of an own vehicle) stored in an own unit. If both IDs match each other, the immobilizer 53 makes judgment to be a success in authentication.

Upon starting the operation, the microcomputer 11 performs cipher communication with the immobilizer 53 through the communication line 51 for authenticating communication. Thus, the microcomputer 11 determines whether or not the electronic key 52 is certified in identification, that is, whether or not the ID delivered from the electronic key 52 matches the ID of the own vehicle, thereby determining whether or not the occupant on the driver's seat is a right occupant.

For instance, if the authentication appears to be in success, the immobilizer ECU53 transmits a code, representing a result of executing operation under a predetermined rule, back to the ECU 1 against a specified code thereof. Then, the microcomputer 11 of the ECU 1 transmits a specified code to the immobilizer ECU 53. Upon exchange of information on an expected code transmitted back against the specified code representing authenticating communication completed in success, then, the ECU 1 determines that the authentication is in success, that is, that the seat occupant is a right driver.

Next, a basic sequence of operations to be executed by the microcomputer 11 of the ECU 1 will be described below with reference to FIGS. 3 to 7.

Figure 3:
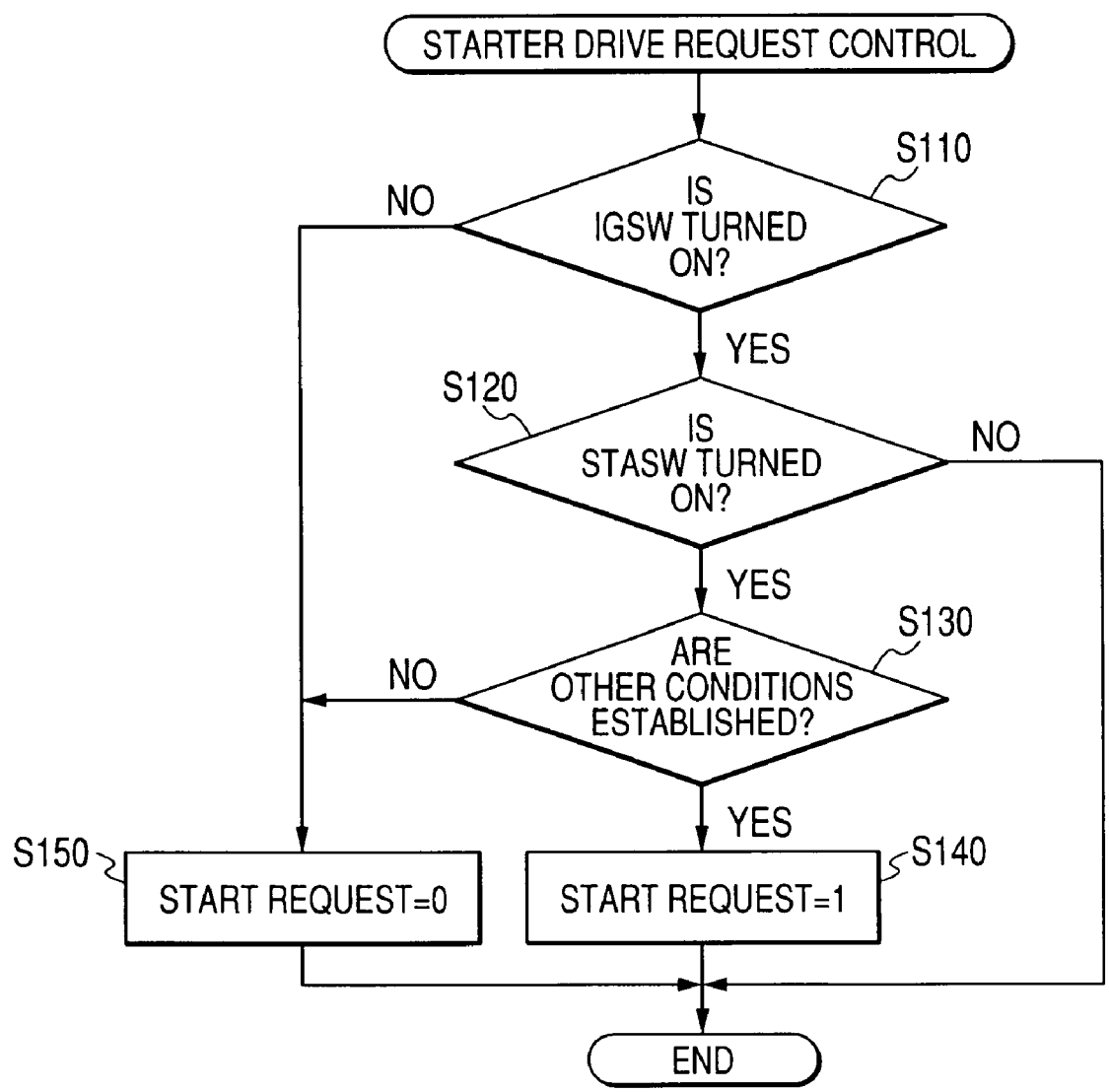
FIG. 3 is a flow chart showing a basic sequence of starter drive request control operations performing part of a method of controlling a startup of an engine according to a first aspect of the present invention.

FIG. 3 is a flowchart showing a basic sequence of starter drive request control operation to be executed by the microcomputer 11 for each fixed time interval. In addition, the starter drive request control operation is processing for discriminating whether to initiate an autostart.

As shown in FIG. 3, as the microcomputer 11 begins to execute the starter drive request control operation, first in S110, a judgment is made based on a level of an ignition switch signal whether or not the ignition start switch 31 is turned on. If the ignition switch 31 is turned on (S110: YES), then, in S120, a judgment is made based on a level of a starter switch signal whether or not the starter switch 33 is turned on. In S120, if the level of the starter switch signal lies at a level representing an existence of a turned-on state (that is, high level in the illustrated embodiment), then, a judgment is made that the starter witch 33 is turned on. This is because the high level of the signal effectively prevents the occurrence of detection in error resulting from noise. In an alternative, the starter switch signal is read out for a given fixed time interval. In this case, if a detection result continuously has more than two high levels a given number of times, a judgment may be made that the starter motor 33 is turned on.

If the judgment is not made in S120 that the starter switch 33 is turned on (S 120: NO), the starter drive request control operation is terminated. In contrast, if the judgment is made that the starter switch 33 is turned on (S120: YES), then, the operation goes to S130 for making judgment whether or not the other startup initiating condition than the condition indicative of the turned-on state of the starter switch 33. For instance, a judgment is made whether or not a vehicle condition remains under conditions where the gear position of the automatic power transmission remains in N (Neutral) or P (Parking) positions and the brake pedal is depressed with the vehicle speed laying at a level less than a given value (such as, for instance, 0). In this case, each of the gear position, the displacement condition of the brake pedal and the vehicle speed can be detected based on the detection signals delivered from the shift position sensor 47, the brake pedal sensor 45 and the vehicle speed sensor 48. In addition, such information can be obtained from the other ECUs via the communication line 51.

In S130, if the judgment is made that the rest of the startup initiating condition is established, then, the operation goes to S140. In S140, a start request flag is set to "1" on a request side for requesting the operation shown in FIG. 4 to be executed in a manner described below for driving the starter relay 7 and the starter motor 3, after which the starter drive request control operation is completed. The starter request flag has an initial value of "0" on a non-request side.

On the contrary, under circumstances where the judgment is made in S110 that the ignition switch 31 is not turned on (S110: 0) and the judgment is made in S130 that the rest of the startup initiating condition is not established (S130: NO), the operation proceeds to S150. In this case, the start request flag is reset to "0" on the non-request side, after which the starter drive request control operation is terminated.

Figure 4:
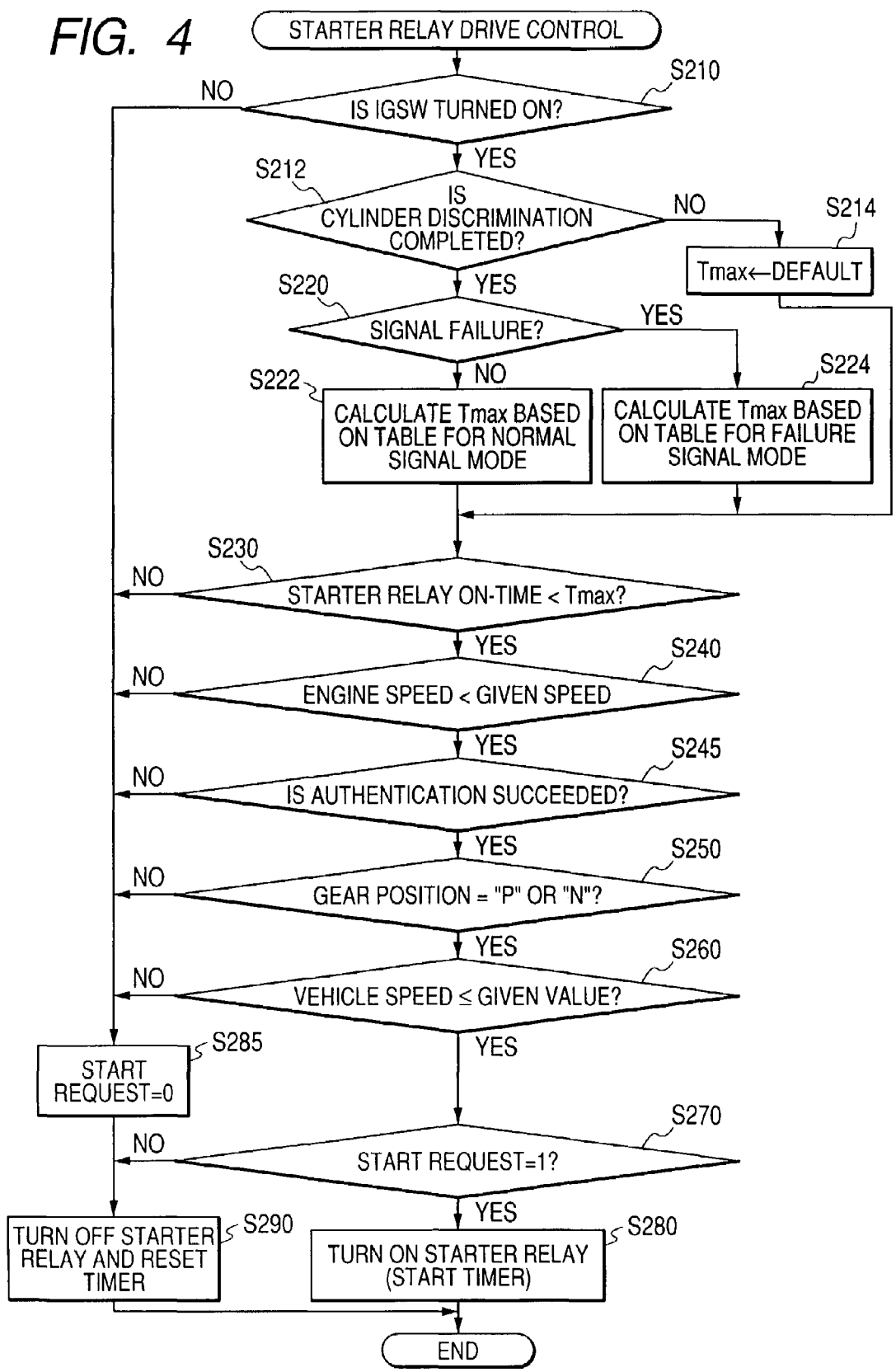
FIG. 4 is a flow chart showing a basic sequence of starter relay drive control operations performing another part of the method of controlling the startup of the engine according to the present invention.

FIG. 4 is a flowchart showing a basic sequence of the starter drive request control operation to be executed with the microcomputer 11 for each fixed time interval in parallel with the operations shown in FIG. 3. The starter drive request control operation is a processing in which a judgment is made whether or not the starter motor 3 needs to be driven upon which the starter relay 7 is controlled.

As shown in FIG. 4, as the microcomputer 11 begins to execute the starter drive request control operation, first in S210, a judgment is made whether or not the ignition switch 31 is turned on. If the ignition switch 31 determined to be turned on, then, the operation goes to S212.

In S212, a judgment is made whether or not cylinder discrimination is completed after the starter relay 7 begins to be turned on in S280 (described below), that is, after the cranking of the engine is initiated.

Figure 5:
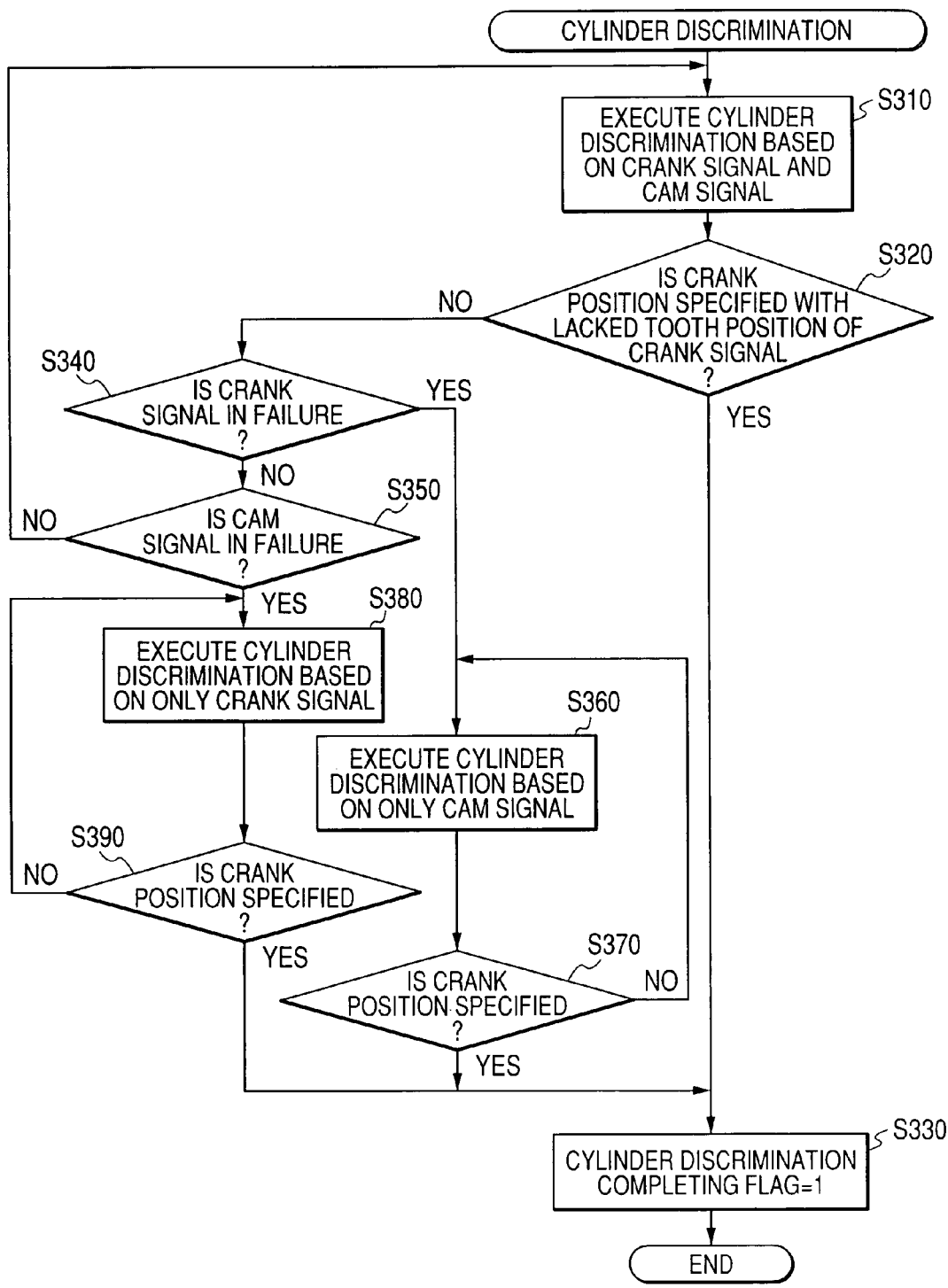
FIG. 5 is a flow chart showing a basic sequence of cylinder discriminating operations performing another part of the method of controlling the startup of the engine according to the present invention.
Figure 6:
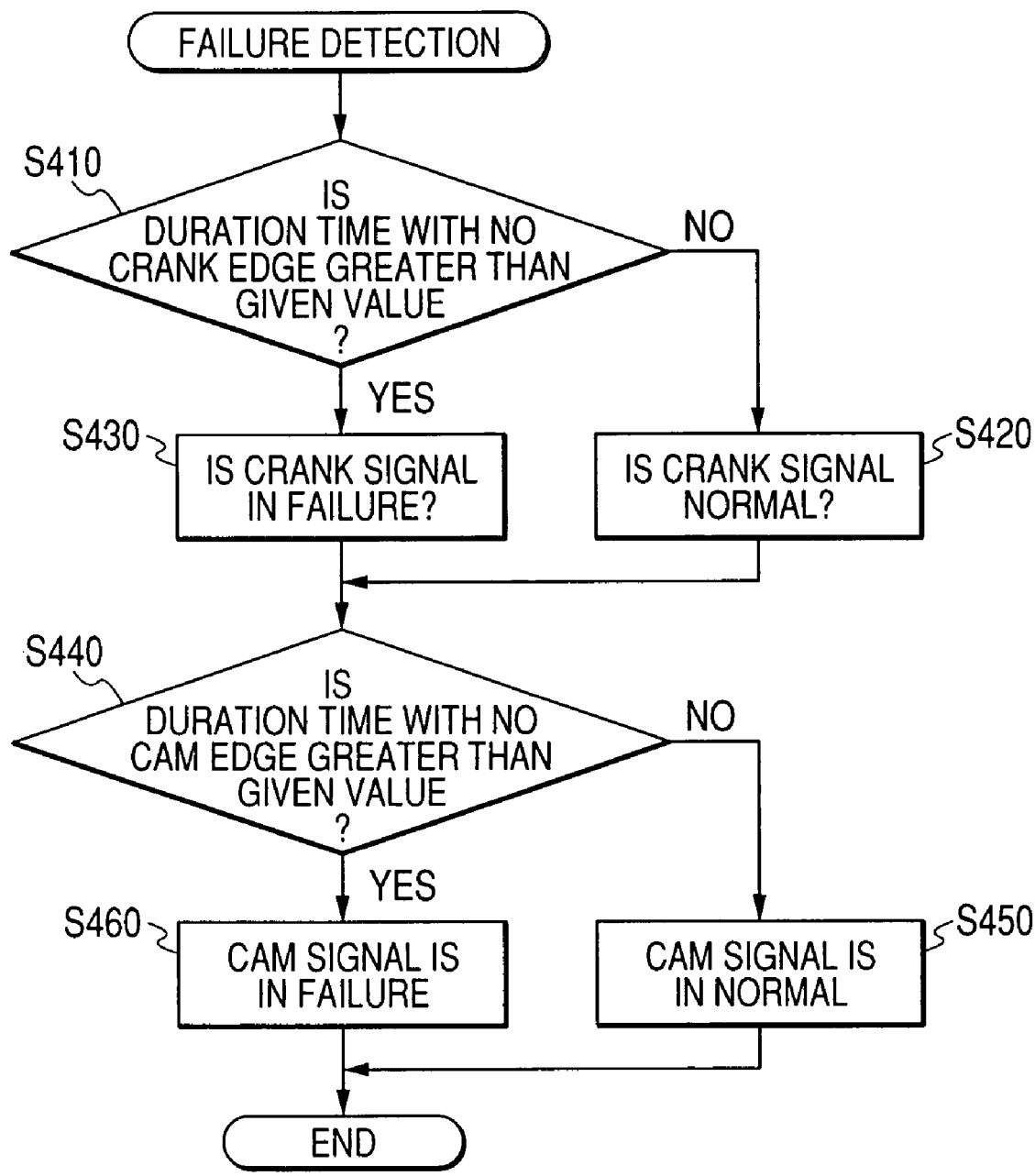
FIG. 6 is a flow chart showing a basic sequence of failure detecting operations for detecting failures in the crank signal and the cam signal, respectively, in performing another part of the method of controlling the startup of the engine according to the present invention.

Now, a description is made of a basic sequence of operations to be executed with the microcomputer 11 for performing cylinder discrimination with reference to FIGS. 5 and 6.

As shown in FIG. 5, as the microcomputer 11 turns on the starter relay 7, the starter motor 3 is driven to crank up the engine. When this takes place, the microcomputer 11 executes an operation (hereinafter referred to as cylinder discriminating operation based on the crank signal and the cam signal) for discriminating a particular cylinder on the basis of both the crank signal and the cam signal which vary in level as shown by the waveforms shown in FIG. 2 according to a cranking angle (S310).

The cylinder discriminating operation based on the crank signal and the cam signal is executed in the manner described with reference to FIG. 2. That is, the lacked tooth detection is performed for the crank signal and the ending edge NE0 of the lacked tooth for the crank signal is detected. During such detection, if the effective edges appear twice in the cam signal for the period of the latest given crank angle (such as, for instance, 60° CA), the current crank angle is specified to be 22.5° CA before the #1TDC. In addition, when detecting the ending edge NE0 of the lacked tooth, if the effective edge appears only once in the cam signal, then, the current crank angle is specified to be 22.5° CA before the #6TDC.

Further, the microcomputer 11 executes failure detecting operations at fixed intervals. If the cylinder discrimination in the cylinder discriminating operation to be executed based on the crank signal and the cam signal is not completed, that is, the crank position is not specified with the lacked tooth position in the crank signal (S320: NO), the microcomputer 11 makes judgment whether or not the crank signal is normally input upon referring to a judgment result of the relevant failure detecting operation (S340) while making judgment whether or not the cam signal is normally input (S350).

As shown in FIG. 6, during the failure detecting operation, the operation is executed to measure a duration time with no effective edge (hereinafter referred to as "crank edge") appearing in the crank signal. If the duration time is not greater than a given value (S410: NO), then, a judgment is made that the crank signal is normally input (S420). In contrast, if the duration time is greater than the given value (S410: YES), then, a judgment is made that the crank signal is in failure (S430). That is, a judgment is made that the crank signal is not correctly input. Likewise, the operation is executed to measure a duration time with no effective edge (hereinafter also referred to as "cam edge") appearing in the cam signal. If the duration time is not greater than a given value (S440: NO), then, a judgment is made that the cam signal is normally input (S450). In contrast, if the duration time is greater than the given value (S440: YES), then, a judgment is made that the cam signal is in failure (S460). That is, a judgment is made that the cam signal is not correctly input.

Turning back to FIG. 5, upon judgment made that the crank signal and the cam signal are normally input (S340: NO and S350: NO), the microcomputer 11 continuously executes the cylinder discriminating operation based on the crank is signal and the cam signal (S310).

Upon completed operation on cylinder discrimination by executing the cylinder discriminating operation based on the crank signal and the cam signal (S320: YES), a cylinder discrimination completing flag is set to "1" (S330).

The microcomputer 11 includes a crank counter whose count value represents a current crank position. Thus, with the crank position being specified, a value of the crank counter is set to a value corresponding to a specified crank position. Thereafter, the latest crank position can be grasped using, for instance, a method of updating a value of the, crank counter by an increment of 15° CA each time the crank edge appears and a method of updating a value of the crank counter by an increment of 15/nj° CA for 1/n (with "n" being an integer number) times the latest time interval of the crank edge. In addition, a fuel injection and ignition for each cylinder are carried out based on the value of the crank counter.

Meanwhile, if a judgment is made that of the crank signal and the cam signal, if the crank signal is not normally input (that is, in failure) (S340: YES), then, the microcomputer 11 executes cylinder discrimination based on only the cam signal (hereinafter referred to as "cylinder discriminating operation based on only the cam signal") in place of executing the cylinder discriminating operation based on the crank signal and the cam signal (S360).

The cylinder discriminating operation based on only the cam signal is executed in a sequence described below.

First, each time the effective edge (cam edge) appears on the cam signal, a time interval between the cam edges is measured. If the current measured value is less than the preceding measured value times a given number (<1), then, a judgment is made that the current cam edge is a cam edge (G0 in FIG. 2) immediately after the extra tooth pulse. Thus, it is specified that the current crank position lie at 30° CA before the #1TDC.

Upon executing the cylinder discriminating operation based on only such a cam signal to specify the crank position (S370: YES), a cylinder discriminating completion flag is set to "1" (S330). Further, in specifying the crank position during the cylinder discriminating operation based on only the cam signal, the microcomputer 11 may execute a method of, for instance, updating a value of a crank counter by an increment of 120/mj° CA for 1/m (with "m" being an integer number) times the latest time interval of the latest cam edge. This allows the latest crank position to be grasped. Thus, fuel injection and ignition for each cylinder are conducted based on the value of the crank counter. This is because the crank signal is not normally input.

Further, upon judgment made that of the crank signal and the cam signal, the cam signal is not normally input in the presence of a failure (S350: YES), then, the microcomputer 11 executes cylinder discrimination based on only the crank signal (hereinafter referred to as "cylinder discriminating operation based on only the crank signal") in place of executing the cylinder discriminating operation based on the crank signal and the cam signal (S380).

The cylinder discriminating operation based on only the crank signal is implemented in a sequence described below.

First, the lacked tooth detection is performed for the crank signal. If the ending edge NE0 of the lacked tooth in the crank signal is detected, the current crank position is temporarily set to a value of, for instance, 22.5° CA before the #1TDC from among a value of 22.5° CA before the #1TDC and a value of 22.5° CA before the #6TDC. Thereafter, the microcomputer 11 allows fuel injection and ignition to be executed for each cylinder based on a result of such temporary specification.

More particularly, when the ending edge NE0 of the lacked tooth is detected in the crank signal, a value of the crank counter is temporarily set to a value corresponding to a phase 22.5° CA before the #1TDC. Thereafter, the value of the crank counter is updated each time the crank edge appears and for each time 1/n times the latest time interval of the crank edge. In addition, fuel injection and ignition are executed for each cylinder based on the value of the crank counter.

Furthermore, a judgment is made whether or not the engine speed exceeds a given rotational speed (of, for instance, 400 rpm) after an elapse of a fixed time (such as, for instance, two seconds) for which a cylinder discrimination result is verified. If the engine speed exceeds the given rotational speed, the temporary specification described above is regarded to be correct. Thus, the crank position (that is, the value of the current crank counter) currently grasped based on a result of the temporary specification is treated to be a true value, at which the cylinder discrimination is completed.

In contrast, if the engine speed does not exceed the given rotational speed, the temporary specification described above is regarded to be incorrect (with the front side and the backside in a reversed state). Thus, the crank position currently grasped based on the result of the temporary specification is displaced by 360° CA (that is, the value of the crank counter is updated to a value displaced by 360° CA), at which the cylinder discrimination is completed. In this case, the engine speed is calculated based on intervals at which the crank edges appear.

With the crank position enabled to be specified upon executing the cylinder discriminating operation based on only the crank signal (S390: YES), a cylinder discriminating completion flag is set to "1" (S330).

With the above, in S212 shown in FIG. 4, the operation is executed by referring to the cylinder discriminating completion flag. In this case, if the cylinder discriminating completion flag is "1", then, a judgment is made that the cylinder discrimination is completed.

Turning back to FIG. 4, if a judgment is made in S212 that no cylinder discrimination is completed, the operation goes to S214. In S214, a limit time Tmax, representing a maximal value of a duration time (hereinafter referred to as a "starter relay-on time") for the starter relay 7 to be turned on and used in judgment in S230 described below is set to a default value, after which the operation proceeds to S230. The term "default value" as used herein refers to a time that is set to be sufficiently longer than the starter relay-on time available for the engine to be reliably started up (for a shift to a runing state) even under a situation where either the crank signal or the cam signal is not correctly input and the cylinder discrimination is executed based on either the cylinder discriminating operation based on only the cam signal or the cylinder discriminating operation based on only the crank signal. Thus, the default value represents a time longer than the limit time Tmax set in each of the operations in S222 and S224 which will be described below in detail.

Further, in S212, if a judgment is made that the cylinder discrimination is completed, then, the operation proceeds to S220 wherein judgment is made whether or not a failure is detected in either the crank signal or the cam signal upon execution of the failure detecting operation in FIG. 6.

If the failure is not detected on the failure detecting operation (S220: NO), the operation goes to S222. In S222, a coolant water temperature of the engine is detected upon which a relevant limit time Tmax corresponding to such a detection value is calculated by referring to a data table for a normal signal mode. The resultant calculated value is set to be the limit time Tmax for use in judgment in S230 which will be described below. Thereafter, the operation goes to S230.

Figure 7:
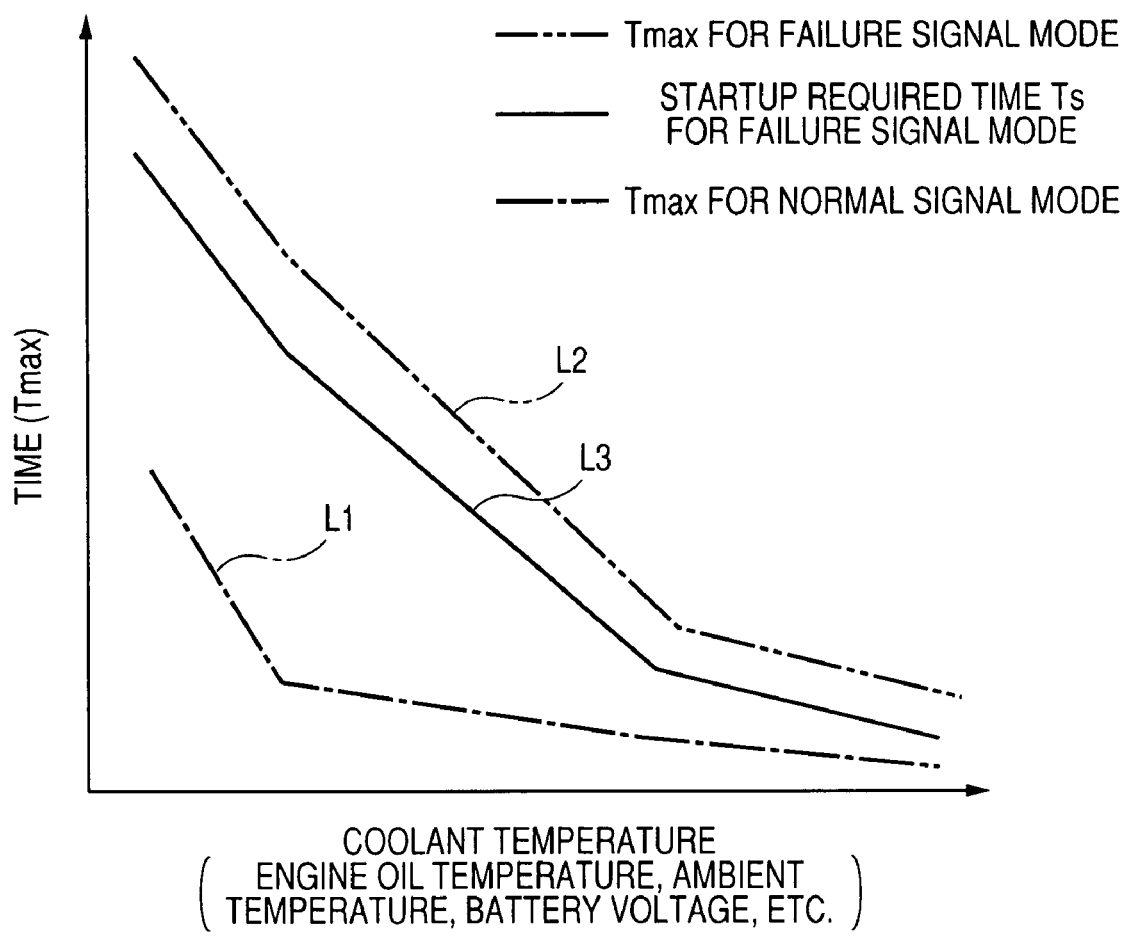
FIG. 7 is an illustrative view showing a data table for use in cylinder discriminating operation.

FIG. 7 is a graph showing the data table to be used in the failure detecting operation. As shown by a single dot line L1, the limit time Tmax is plotted in the data table in terms of the coolant water temperature and such data is preliminarily stored in a non-volatile memory such as ROM or the like inside the microcomputer 11. Therefore, the microcomputer 11 is able to calculate the limit time Tmax upon allocating a detection value on the coolant water temperature to the data table for the normal signal mode. In addition, the data table for the normal signal mode is set to allow the calculation such that the lower the coolant water temperature, the longer will be the limit time Tmax. This is because it is conceived that the lower the coolant water temperature, the harder will be for the engine to start up, that is, the lower will be the startability of the engine. Further, the data table for the normal signal mode is set so as to perform the calculation such that the limit time Tmax is longer than a startup required time for the normal signal mode. In addition, the term "startup required time for the normal signal mode" refers to a theoretical or experimental maximal time starting from a timing at which the starter relay 7 (starter motor 3) begins to be driven to a time in which the cylinder discrimination is completed through the cylinder discriminating operation, executed based on the crank signal and the cam signal, and fuel injection and ignition are initiated based on the cylinder discriminating result to allow the engine to enter the running state.

In S220, further, if a judgment is made that upon execution the failure detecting operation, a failure is detected in either the crank signal or the cam signal (S220: YES), the operation proceeds to S224. In this moment, the coolant water temperature of the engine is detected and the limit time Tmax corresponding to the resultant detection value is calculated upon referring to the data table for the normal signal mode. Then, the resulting calculated value is set to be the limit time Tmax for use in judgment in S230 which will be described later, after which the operation proceeds to S230.

As shown by a double dot line L2 in FIG. 7, the limit time Tmax is plotted in the data table in terms of the coolant water temperature and such data is preliminarily stored in a non-volatile memory such as ROM or the like inside the microcomputer 11. Further, the data table for the normal signal mode is set so as to perform the calculation such that the lower the coolant water temperature, the longer will be the limit time Tmax.

A data table for a failure signal mode is set such that the limit time Tmax is calculated to be longer than that of the data table for the normal signal mode provided that the coolant water temperature remaining at the same value. To explain in a further detail, a solid line L3 shown in FIG. 7 represents a theoretical or experimental maximal time (hereinafter referred to as "a startup required time for a failure signal mode") Ts starting from a timing at which the starter relay 7 (starter motor 3) begins to be driven to a time in which the cylinder discrimination is completed either through the cylinder discriminating operation, executed based on only the cam signal, or through the cylinder discriminating operation, executed based on only the crank signal. Fuel injection and ignition are initiated based on the cylinder discriminating result to allow the engine to enter the running state.

The data table for the normal signal mode is set such that the limit time Tmax is calculated to be shorter than the startup required time Ts for the failure signal mode. The data table for the failure signal mode is set such that the limit time Tmax is calculated to be longer than the startup required time Ts for the failure signal mode.

While with the illustrated embodiment, the limit time Tmax is calculated based on the coolant water temperature, in place of using the parameter on the coolant water temperature, the limit time Tmax may be calculated based on any one of other detection values such as, for instance, an oil temperature (a temperature of lubricating oil), an ambient temperature around a vehicle, an intake-air temperature (a temperature of an intake air) of an engine, and a battery voltage. In such an alternative, the data table for the normal signal mode and the data table for the failure signal mode may be arranged such that the lower the respective temperatures or a value of the battery voltage, the longer will be the limit time Tmax. In addition, the limit time Tmax may be calculated based on at least two parameters of the coolant water temperature, the oil temperature, the ambient temperature of the vehicle, the intake-air temperature and the battery voltage.

In next S230, a judgment is made whether or not the current starter relay turn-on time (duration time for the starter relay 7 remains in a turned-on state) is less than the limit time Tmax set in any of the operations in S214, S222 and S224. In this moment, the starter relay turn-on time is grasped with a value of a timer that is initiated when the operation in S280 (described below) begins to turn on the starter relay 7.

In S230, if a judgment is made to be positive that the current starter relay on-time is less than the limit time Tmax, then, in S240, a judgment is made whether or not the engine speed is less than a given rotational speed (of, for instance, 700 rpm) deemed to be a complete combustion taking place in the engine. If a judgment is made to be positive that the engine speed is less than the given rotational speed, the operation proceeds to S245. Under a circumstance where upon the execution of the failure detecting operation shown in FIG. 6, the crank signal is determined to be normal, the engine speed is calculated based on the incident time interval between the crank edges. Under another circumstance where upon the execution of the failure detecting operation shown in FIG. 6, the crank signal is determined to be in failure, the engine speed is calculated based on the incident time interval between the cam edges.

In S245, a judgment is made whether or not the authentication is completed in success in the authenticating communication with the immobilizer ECU 53 described above, that is, whether or not the authenticating communication is established with the immobilizer ECU 53 in success. If the authentication is found to be positive in success, then, the operation proceeds to S250. In addition, the authentication in the success constitutes one of the startup initiating conditions.

In S250, a judgment is made whether or not a gear position remains in an "N"(Neutral) or "P" (Parking) position in the automatic power transmission.

In S250, if the judgment is made to be positive that the gear position remains in the "N" or "P" position, then in S260, a judgment is made whether or not a vehicle is speed is less than a given value (of, for instance, "0"). With the vehicle speed judged to be positive that the vehicle speed is less than the given value, then, the operation goes to S270.

In S270, a judgment is made whether or not the start request flag remains at "1". If the start request flag remains at "1", then, the operation goes to S280 wherein a starter relay drive signal applied to the starter relay drive circuit 13 is rendered to have an active level for turning on the starter relay 7. If the starter relay 7 is initially turned on (that is, altered from a turned-off state to a turned-on state) in S280, the timer is initiated for measuring the starter relay turn-on time. Subsequently, the starter relay driving control operation is terminated.

If the judgment is made in S270 that the start request flag does not remain at "1," then, the operation goes to S290. If the starter relay drive circuit 13 is rendered to have a non-active level for turning off the starter relay 7, while stopping the timer in a reset state for the starter relay turn-on time to be measured. Thereafter, the current starter relay driving control operation is terminated.

On the contrary, if any one of the operations in S210 and S230 to S260 is judged to be negative with "NO", the operation proceeds to S285. In this moment, the operation is executed to initialize the starter request flag to "0" and, subsequently, the operation in S290 is executed, after which the current starter relay driving control operation is terminated.

If the operation in S230 is judged to be negative with "NO", that is, when the judgment is made that the starter relay turn-on time has reached the limit time Tmax, the operations in S285 and 290 are executed. This is because with the starter relay turn-on time has reached the limit time Tmax, the drive of the starter motor 3 is forcibly interrupted even when the engine does not reach the running state. This prevents the starter motor 3 from being continuously and unintentionally driven due to some failure in input conditions or the like. In addition, this prevents the occurrence of a battery death or deterioration in a battery due to the starter motor 3 being driven for a longer period of time.

Figure 8:
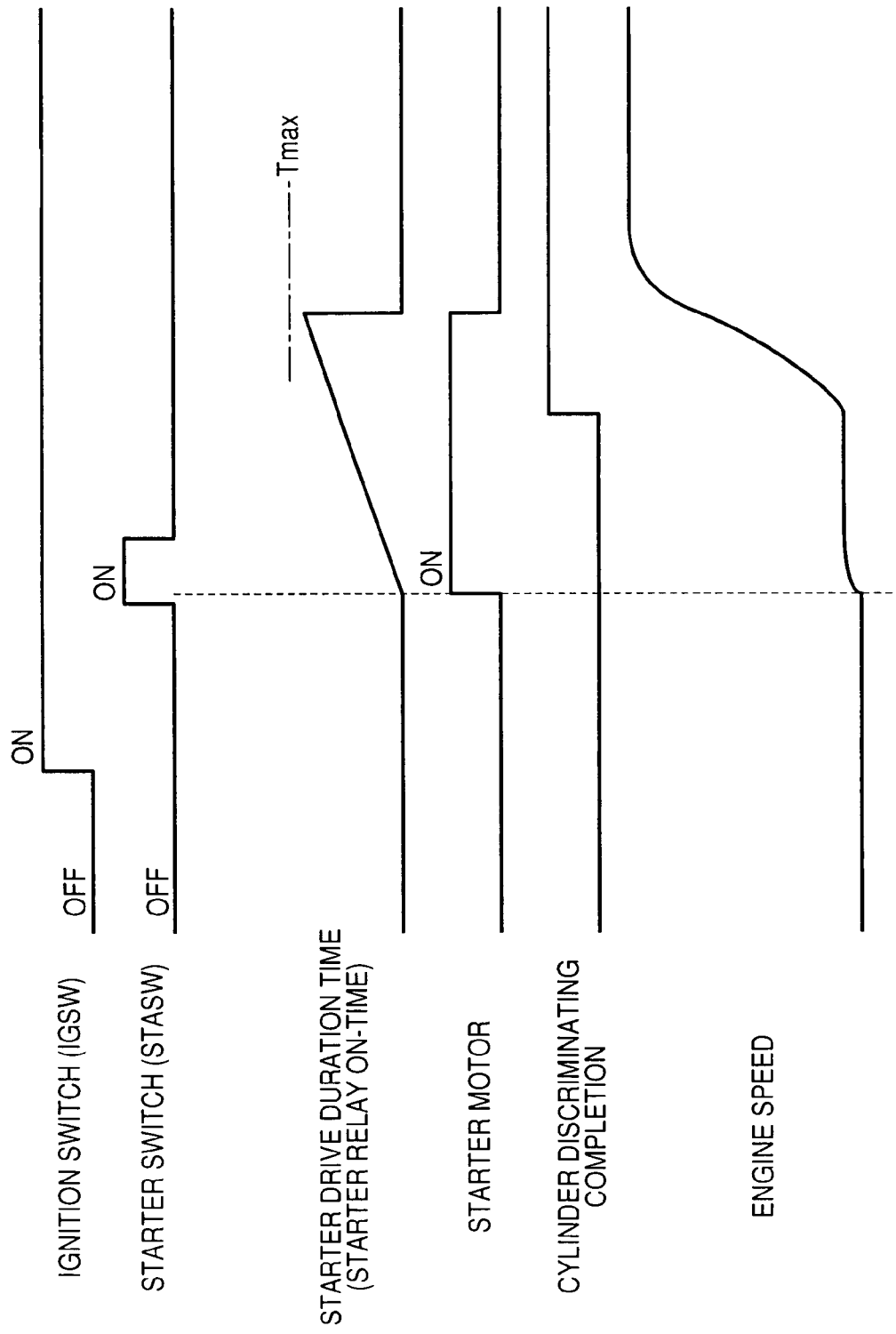
FIG. 8 is a first timing chart representing the operation of an engine ECU forming the engine control apparatus shown in FIG. 1.
Figure 9:
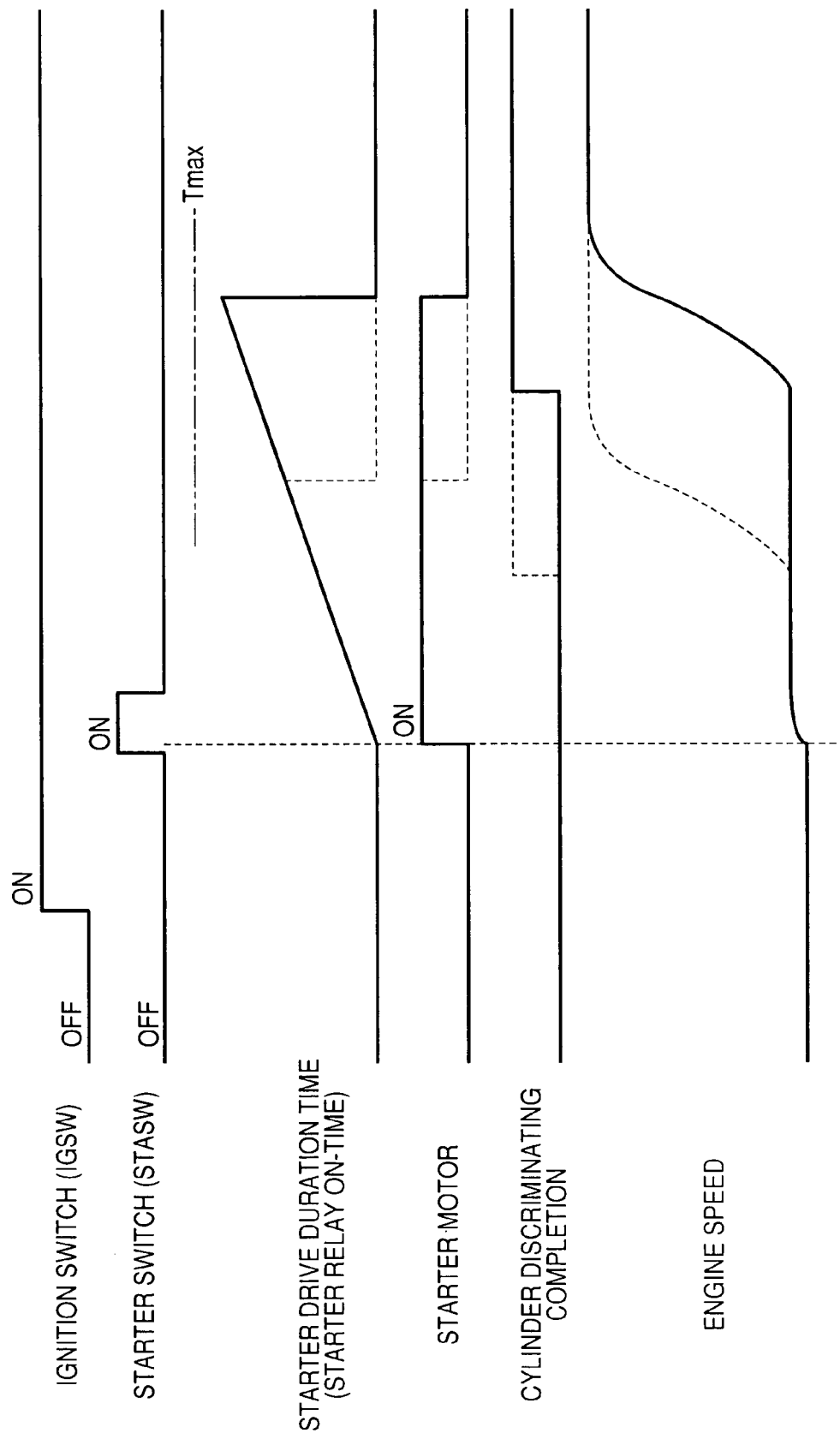
FIG. 9 is a second timing chart representing the operation of the engine ECU forming the engine control apparatus shown in FIG. 1.

Operations and advantageous effects of the ECU 1 will be described below with reference to timing charts shown in FIGS. 8 and 9. FIG. 8 shows an exemplary case wherein the crank signal and the cam signal are normally input and FIG. 9 shows another exemplary case wherein the crank signal and the cam signal are not normally input.

As shown in FIG. 8, as the ignition switch (IGSW) 31 is turned on, the ECU 1 allows the microcomputer 11 to begin processing on various operations. Thereafter, starter switch 33 is turned on. When the turned-on state of the starter switch 33 is detected (S120: YES), if the other conditions to be judged in S130 shown in FIG. 3 are further established, then, the start request flag is set to "1" (S140). In addition, if the respective conditions to be judged in S240 to S260 shown in FIG. 4 are established on the results with "YES", the starter relay 7 is turned on (S280). In this moment, the starter motor 3 is driven, commencing the cranking of the engine. When this takes place, further, the timer is caused to start measuring the starter relay turn-on time (S280). In this case, on a stage before the starter relay 7 is turned on, the limit time Tmax for use in judgment in S230, shown in FIG. 4, is set to the default value. Thus, the judgment is certainly made to be "YES" in S230 shown in FIG. 4.

Here, during a normal mode wherein the crank signal and the cam signal are available to be normally input, if the cranking of the engine is commenced, the microcomputer 11 executes the cylinder discriminating operation (S310) for making cylinder discrimination. In this moment, if the cylinder discrimination is completed with the crank position being specified, then, fuel injection and ignition are initiated for each cylinder of the engine.

Subsequently, if the engine speed exceeds a given speed (S240: NO), then, the microcomputer 11 makes judgment that the engine enters the running state (in is complete combustion). In this moment, the starter request flag is reset to "0" to turn off the starter relay 7, causing the starter motor 3 to stop (S285: S290).

When the cylinder discrimination is completed, the crank signal and the cam signal are normally input. Under such a situation, the operation in S222 shown in FIG. 4 is executed to alter the limit time Tmax to a value (<default value) that is calculated based on the data table for the normal signal mode. In this case, the resulting altered value is longer than the startup required time for the normal signal mode. Thus, no probability occurs for the negative judgment to be made with "NO" in S230 shown in FIG. 4 before the engine enters the running state, that is, before the negative judgment is made with "NO" in S240 in FIG. 4. Thus, the starter relay 7 is not forcibly turned off.

On the contrary, under a circumstance where the engine encounters a failure wherein either the crank signal or the cam signal is not normally input, if the cranking of the engine is commenced, the microcomputer 11 results in operation to execute the cylinder discrimination based on either the cylinder discriminating operation based on only the cam signal or the cylinder discriminating operation based on only the crank signal. In this case, the cylinder discrimination has less information and a maximal time between timing at which the starter relay 7 begins to be turned on and timing at which the cylinder discrimination is completed becomes longer than that required for the normal mode.

More particularly, with the cylinder discriminating operation based on the crank signal and the cam signal for the normal signal mode, the cylinder discrimination can be executed at timing in which the lacked tooth is present and, hence, a time interval between the beginning of the cranking and the completion of the cylinder discrimination has a maximum value of a time up to 360° CA. In contrast, with the cylinder discriminating operation based on only the cam signal, it takes time for a maximal value of up to 720° CA until the cylinder discrimination is completed. With the cylinder discriminating operation based on only the crank signal, it takes time for a maximal value of up to and including "time for 360° CA and a fixed time interval for authentication on the cylinder discrimination result" until the cylinder discrimination is completed.

Therefore, if either the crank signal or the cam signal is not normally input, the maximum time for a period starting from the commencement on driving the starter motor 3 to a phase in which the engine enters the running state.

Accordingly, if it is assumed that the limit time Tmax for use in making judgment in S230 in FIG. 4 is set to the same value as that of the normal mode, that is, a value when the crank signal and the cam signal are normally input, a judgment is made with "NO" in S230 in FIG. 4 before the engine enters the running state upon beginning to drive the starter motor 3. This results in a fear of forcibly interrupting the drive of the starter motor 3.

Therefore, if the judgment is made that either the crank signal or the cam signal is in failure (S220: YES), the ECU 1 of the present embodiment calculates the limit time Tmax, for use in executing judgment in S230 in FIG. 4, based on the data table for the failure signal mode. This allows the limit time Tmax to be longer than the value for the normal mode and the limit time Tmax is set to a time longer than the startup required time Ts for the failure signal mode (S224).

As shown in FIG. 9, therefore, even if a failure occurs and either the crank signal or the cam signal is not normally input upon which it takes a longer period of time from the operation to begin driving the starter motor 3 to the operation causing the engine to enter the running mode, the starter relay turn-on time can be avoided from reaching the limit time Tmax before the judgment is made with "NO" in S240 in FIG. 4. Therefore, no probability takes place for the starter motor 3 from being forcibly interrupted before the engine enters the running mode upon negative judgment being executed with "NO" in S230 in FIG. 4. This makes it possible to reliably start up the engine. In FIG. 9, a dotted line is plotted for designating a state under a normal mode shown in FIG. 8 for a reference.

With the ECU 1 of the present embodiment, further, the limit time Tmax is set to the default value corresponding to the predetermined initial value (S212: NO, S214). Then, if a failure is not detected in both of the crank signal and the cam signal at time when the cylinder discrimination is completed (S212: YES), that is, when the cylinder discrimination is conducted through the cylinder discriminating operation based on the crank signal and the cam signal, then, the limit time Tmax refreshes to be set to a preset time for the normal mode again to be shorter than the default value (S220: NO, S222).

In contrast, if a failure is detected in either the crank signal or the cam signal, that is, when the cylinder discrimination is conducted through the cylinder discriminating operation based on only the cam signal, then, the limit time Tmax refreshes to be set to a preset time for the normal mode to be shorter than the default value but longer than the preset time for the normal mode (S220: YES, S224).

That is, the limit time Tmax is set to the sufficiently long default value until the cylinder discrimination is completed and refreshes to be set to a desired time to be shorter than the default value until the cylinder discrimination is completed. Then, upon completion of the cylinder discrimination, the limit time Tmax is set to shorter time, depending on needs, than the default value.

Thus, the operation can be executed to reliably switch and set the limit times Tmax to the value for the normal signal mode where both the crank signal and the cam signal are normally input and another value for the failure signal mode where the failure occurs in either the crank signal or the cam signal. This is because a failure detection result (a detection result on a failure detecting operation) is affirmed at time when the cylinder discrimination is completed and the limit time Tmax is switched and set at such a time point.

Furthermore, with the ECU 1 of the present embodiment, as shown in FIG. 7, the limit times Tmax are set to a value depending on the detection value on information (such as, for instance, a coolant water temperature, an oil temperature, an ambient temperature and a battery voltage) related to startability of the engine, enabling the limit time Tmax to have an optimum value at all times.

With the engine control apparatus of the first embodiment set forth above, the cylinder discriminating operation executed in step S310 in FIG. 5 based on the crank signal and the cam signal corresponds to first cylinder discriminating means. The failure detecting operation shown in FIG. 6 corresponds to failure detecting means. Further, the cylinder discriminating operation executed in step S360 in FIG. 5 based on only the cam signal and the cylinder discriminating operation executed in step S380 in FIG. 5 based on only the crank signal correspond to second cylinder discriminating means. In addition, the starter drive request controlling operation shown in FIG. 3 and the operations in steps S210 and S240 to S290 shown in FIG. 4 correspond to automatic startup controlling means. Moreover, the timer startup operation in step S280 shown in FIG. 4 and the operations in step S230 shown in FIG. 4 correspond to drive time limiting means. In addition, the operations in steps S212 to S224 shown in FIG. 4 correspond to limit time setting means.

Second Embodiment

Next, an engine ECU of a second embodiment according to the present invention will be described below. The engine ECU of the second embodiment has the same hardware structure as that of the engine ECU 1 of the first embodiment and the same component parts as those of the first embodiment bear like reference numerals to simplify the description. This similarly applies to other embodiment that will be described later.

Figure 10:
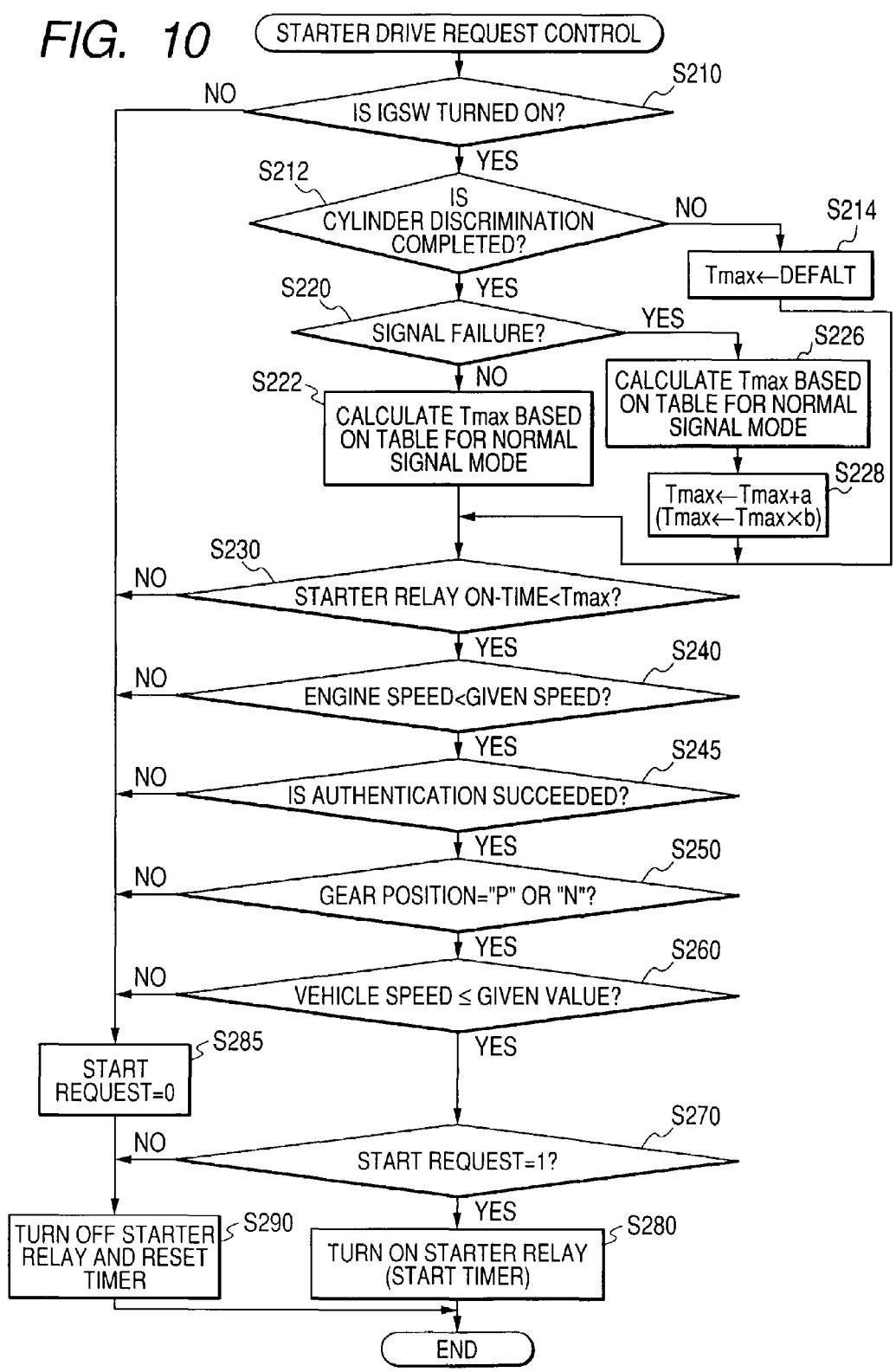
FIG. 10 is a flow chart showing a basic sequence of starter drive request control operations performing part of a method of controlling a startup of an engine according to a second aspect of the present invention.

The engine ECU 1 of the second embodiment differs from that of the first embodiment in that the non-volatile memory of the microcomputer 11 does not store the data table for the failure signal mode and that the microcomputer 11 executes a starter relay drive controlling operation, shown in FIG. 10, in place of the operation shown in FIG. 4.

In addition, the starter relay drive controlling operation, shown in FIG. 10, differs from the operation, shown in FIG. 4, in that the microcomputer 11 executes operations in S226 and S228 in place of S224.

In particular, with the starter relay drive controlling operation to be executed in the second embodiment, if a judgment is made in S220 during the failure detecting operation that a failure is detected in either the crank signal or the cam signal, the flow proceeds to S226. Like S222, in S226, the coolant water temperature of the engine is detected to provide a coolant water temperature detection signal, upon which the operation is executed to calculate a limit time Tmax, corresponding to the coolant water temperature detection signal, based on the data table for the normal signal mode. In next S228, a given value "a" (>0) is added to the limit time Tmax calculated in the calculation executed in S226. A value resulting from such adding operation is set to be a limit time Tmax for use in S230, after which the flow proceeds to S230.

In addition, the given value "a" is set to a value to be longer than a startup required time Ts for the failure signal mode shown in FIG. 7. With the second embodiment, moreover, the operations in S212 to S228, shown in FIG. 10, correspond to limit time setting means.

Thus, the engine ECU 1 of the second embodiment also has the same advantageous effects as those of the first embodiment.

Meanwhile, in S228, a value of the limit time Tmax, obtained in calculation executed in S226, is multiplied by a given value "b" greater than "1". This provides a multiplied value, that is, the calculated value in S226 is made longer by a given rate. Such a value is set to be a limit Tmax for use in judgment to be executed in S230. Even in such a case, the multiplied value may be set to a value longer than the startup required time Ts for the failure signal mode.

As described above with reference to the engine ECU 1 of the first embodiment, in S226, the limit time Tmax may be calculated depending on, in place of the coolant water temperature, a parameter such as, for instance, any one of the oil temperature, the ambient temperature around the vehicle and the battery temperature. In an alternative, the limit time Tmax may be calculated depending on more than two parameters of the coolant water temperature, the oil temperature, the ambient temperature and the battery temperature.

Third Embodiment

Next, an engine ECU of a third embodiment according to the present invention will be described below.

The engine ECU 1 of the third embodiment differs from the engine ECU 1 of the first embodiment in that the non-volatile memory of the microcomputer 11 does not store the data table for the failure signal mode but stores a data table (hereinafter referred to as "failure mode startup required time calculation table"), in place of the above data table, for calculating a startup required time Ts for the failure signal mode. In addition, the failure mode startup required time calculation table has data plotted in terms of the coolant water temperature and the startup required time Ts for the failure signal mode in a manner similar to the solid line L3 shown in FIG. 7.

Figure 11:
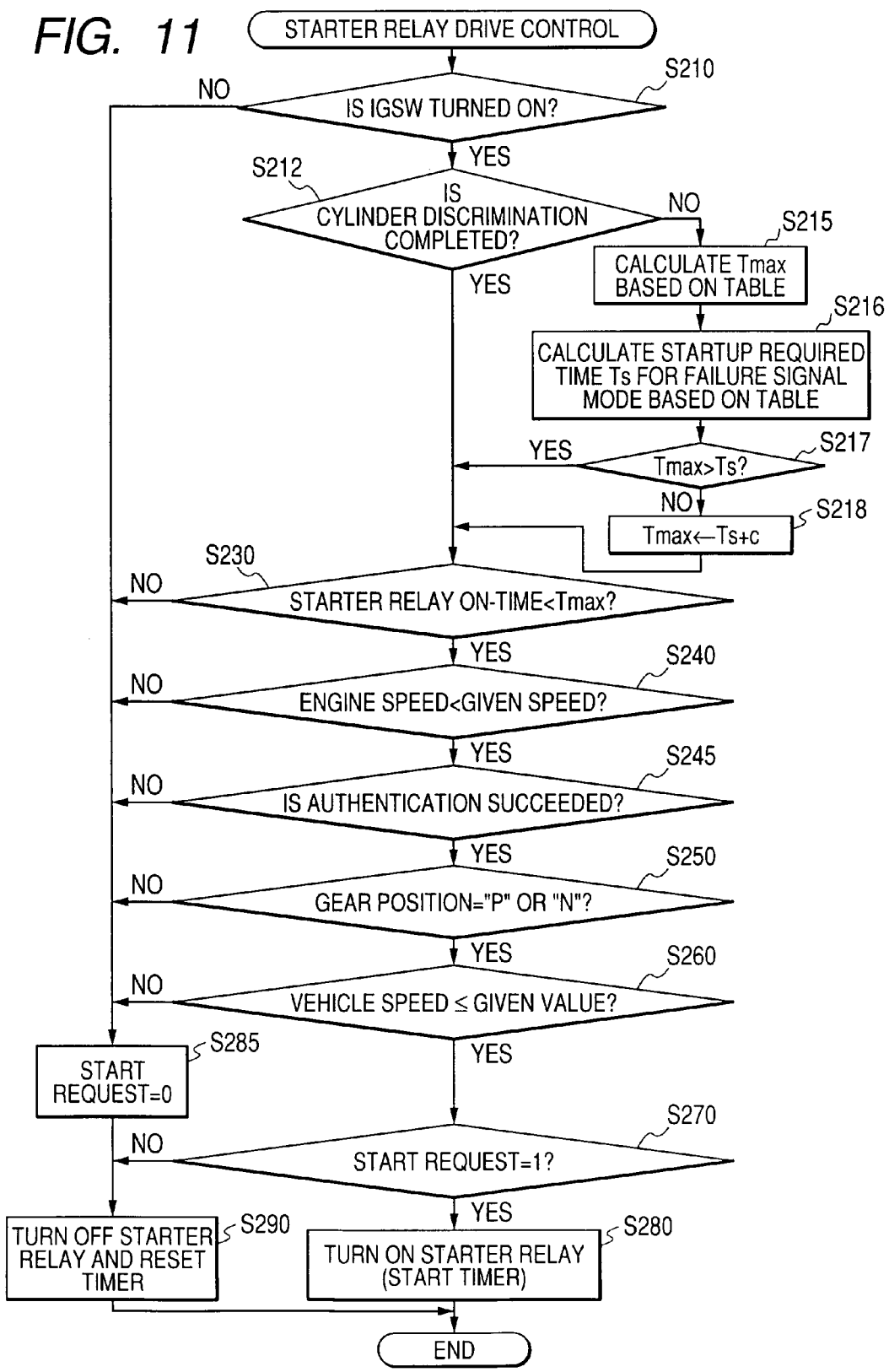
FIG. 11 is a flow chart showing a basic sequence of starter relay drive control operations performing another part of a method of controlling a startup of an engine according to a third aspect of the present invention.

Further, with the engine ECU 1 of the third embodiment, the microcomputer 11 executes the starter relay drive controlling operation, shown in FIG. 11, in place of the operation shown in FIG. 4.

The starter relay drive controlling operation, shown in FIG. 11, differs from the operation shown in FIG. 4 in that the operations in S220 to S224 are removed and the microcomputer 11 executes the operations in S215 to 218 in place of the operation in S214.

In particular, with the starter relay drive controlling operation in the third embodiment, if judgment is made in S212 that no cylinder discrimination is completed, the operation proceeds to S215.

Like the operation in S222 shown in FIG. 4, the coolant water of the engine is detected in S215 to provide a coolant water temperature signal, upon which the limit time Tmax, corresponding to the coolant water temperature signal, is calculated based on the data table for the failure signal mode.

In next S216, the operation is executed to calculate the startup required time Ts for the failure signal mode, corresponding to the coolant water temperature signal, based on the failure mode startup required time calculation table.

In succeeding S217, a judgment is made whether or not the limit time Tmax, calculated in S215, is greater than the startup required time Ts for the failure signal mode calculated in S216. If Tmax>Ts (S217: YES), the limit time Tmax, calculated in S215, is set to be the limit time Tmax intact for use in judgment in S230, after which the operation proceeds to S230.

On the contrary, if the judgment is made that the relationship Tmax>Ts is absent, the operation proceeds to S218. In S218, the operation is executed to add a given value "c" (>0) to the limit time Tmax for the failure signal mode, calculated in S216, to provide a calculated value. The calculated value is set to be the limit time Tmax for use in judgment in S230, after which the flow proceeds to S230.

If the judgment is made in S212 that the cylinder discrimination is completed, the operation proceeds to S230 intact.

Upon completion of the cylinder discrimination, the limit time Tmax, finally set in the operations in S215 to S218, is used in judgment in S230.

That is, with the starter relay drive controlling operation in the third embodiment, the operation is executed to make comparison in magnitude relation between the limit time Tmax for the normal signal mode calculated based on the coolant water temperature and the startup required time Ts for the failure signal mode calculated based on the same coolant water temperature. Upon comparison, if the relationship of Tmax>Ts is absent, then, the operation is executed to set the limit time Tmax, for use in judgment in S230, to have a longer time (=Ts+c) than the calculated startup required time Ts for the failure signal mode. Therefore, the limit time Tmax for use in judgment in S230 is set to the longer time than the calculated startup required time Ts for the failure signal mode at all times.

Thus, even with the engine ECU 1 of the third embodiment, if a failure occurs in either the crank signal or the cam signal with any of these signals being not normally input, the engine ECU 1 of the third embodiment can reliably avoid the negative judgment made with "NO" in S230 before the engine enters the running state to prevent the driving state of the starter motor 3 from being forcibly interrupted.

With the third embodiment, the engine ECU 1 is configured to execute the operation in S215 in structure in which the operations in S216 to S218 are additionally executed. This satisfies the condition in that the limit time Tmax, used in judgment in S230, is greater than the startup required time Ts for the failure signal mode. In each of the operations in S215 and S216, the limit time Tmax and the startup required time Ts for the failure signal mode may be calculated based on, in place of using the coolant water temperature, any one of other detection values such as, for instance, the oil temperature, the ambient temperature, the intake-air temperature and the battery voltage.

In addition, the limit time Tmax and the startup required time Ts for the failure signal mode may be calculated based on more than two parameters of the coolant water temperature, the oil temperature, the ambient temperature, the intake-air temperature and the battery voltage.

Meanwhile, with the engine ECU 1 of the third embodiment, the operation in S215 corresponds to limit time calculating means. Likewise, the operation in S216 corresponds to failure startup required time calculating means and the operations in S217 and S218 correspond to setting means.

While the specific embodiments of the present invention have been described above in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention.

For instance, while the present invention has been described above with reference to the cam signal and the crank signal with the waveforms shown in FIG. 2, the present invention is not limited to the cam signal and the crank signal of such waveforms. That is, the signal waveforms shown in, for instance, Patent Publication 2 may be used.

Further, in alternatives, the cylinder discriminating operation based on the crank signal and the cam signal, the cylinder discriminating operation based on only the cam signal and the cylinder discriminating operation based on only the crank signal may take various steps that are suitably designed depending on the waveforms of the crank signal and the cam signal.

For instance, for the cylinder discriminating operation based on the crank signal and the cam signal, the operation may be executed to specify a crank position based on the number of crank edges appearing during a period in which the cam signal takes a high or low level. Furthermore, with the engine comprising a five-cylinder engine, the cylinder discriminating operation based on only the crank signal may execute the operation to specify a crank position upon discriminating a difference in fluctuations in the engine rotational speed appearing before and after timing at which the lacked tooth is detected.

Moreover, each of the cam sensor and the cam signal may not be limited to one component and may include more than two components. With a structure utilizing a plurality of cam signals, for a normal mode, the cylinder discrimination may be performed based on the crank signal and the plurality of cam signals in combination. In contrast, for a failure signal mode wherein either the crank signal or the cam signal is not normally input, the cylinder discrimination may be performed based on the crank signal and a normal rest of the cam signals in combination. Further, if no crank signal is normally input, the cylinder discrimination may be performed based on a plurality of normal cam signals in combination.

What is claimed is:

1. An engine control apparatus for a multi-cylinder engine, installed on a vehicle, which has a crank sensor for detecting rotation of a crankshaft of the engine to output a crank signal depending on the rotation of the crankshaft, and a cam sensor for detecting rotation of a camshaft to output a cam signal depending on the rotation of the camshaft, the engine control apparatus comprising:

first cylinder discriminating means for executing cylinder discrimination based on the crank signal and the cam signal under a normal signal mode;

failure detecting means for detecting failures in the crank signal and the cam signal, respectively; and second cylinder discriminating means for executing the cylinder discrimination, in place of the first cylinder discriminating means based on the crank signal and the cam signal under the normal signal mode, in the presence of the failure in either the crank signal or the cam signal;

wherein the engine control apparatus causes fuel injection and ignition to be initiated for each cylinder of the engine based on the cylinder discrimination executed by either the first cylinder discriminating means or the second cylinder discriminating means;

automatic startup control means for cranking the engine upon driving a starter device until judgment is made that the engine enters a running state in the presence of judgment that a specified startup initiating condition is established;

drive time limiting means for interrupting the automatic startup control means from driving the starter device when a duration time for the automatic startup control means to drive the starter device is measured upon which judgment is made that the duration time reaches a limit time; and limit time setting means for setting the limit time to a longer time than a preset time for the normal signal mode when the failure detecting means detects the failure in either the crank signal or the cam signal.

2. The engine control apparatus claimed in claim 1, wherein:
   assume that in the presence of the failure in either the crank signal or the cam signal, a time, for which the starter device begins to crank the engine and the second cylinder discriminating means completes executing the cylinder discrimination to provide a cylinder discriminating result based on which the fuel injection and the ignition are initiated to cause the engine to enter the running state, is Ts, the limit time setting means set the limit time to be longer than Ts in the presence of the failure in either the crank signal or the cam signal.

3. The engine control apparatus claimed in claim 1, wherein:
   the limit time setting means is operative to set the limit time to a predetermined initial value until either the first cylinder discriminating means or the second cylinder discriminating means completes the execution of the cylinder discrimination after which when the first cylinder discriminating means and the second cylinder discriminating means complete the execution of the cylinder discrimination, the limit time setting means freshens the limit time to be set to a first time for a normal signal mode to be shorter than the initial value in the absence of the failure in either the crank signal or the cam signal and freshens the limit time to be set to a second time for a failure signal mode to be shorter than the initial value but to be longer than the first time for the normal signal mode, in the presence of the failure in either the crank signal or the cam signal.

4. The engine control apparatus claimed in claim 1, wherein:
   the limit time setting means is operative to set the limit time to a time, which is equal to a value in which a given value is added to a setting time for a normal mode, or a time in which the setting time for the normal mode is made longer by a given rate.

5. The engine control apparatus claimed in claim 1, wherein:
   the limit time setting means is operative to detect specified information related to startability of the engine from among information relevant to the vehicle and set the limit time depending on a detection value on the specified information such that the lower the startability of the engine represented by the detection value, the longer will be the limit time.

6. The engine control apparatus claimed in claim 5, wherein:
   the specified information has at least one of a battery voltage of the vehicle, an ambient temperature around the vehicle, a coolant water temperature of the engine and a temperature of lubricating oil of the engine.

7. An engine control apparatus for a multi-cylinder engine, installed on a vehicle, which has a crank sensor for detecting rotation of a crankshaft of the engine to output a crank signal depending on the rotation of the crankshaft, and a cam sensor for detecting rotation of a camshaft to output a cam signal depending on the rotation of the camshaft, the engine control apparatus comprising:

first cylinder discriminating means for executing cylinder discrimination based on the crank signal and the cam signal under a normal signal mode;

failure detecting means for detecting failures in the crank signal and the cam signal, respectively;

second cylinder discriminating means for executing the cylinder discrimination, in place of the first cylinder discriminating means based on the crank signal and the cam signal under the normal signal mode, in the presence of the failure in either the crank signal or the cam signal;

wherein the engine control apparatus causes fuel injection and ignition to be initiated for each cylinder of the engine based on the cylinder discrimination executed by either the first cylinder discriminating means or the second cylinder discriminating means;

automatic startup control means for cranking the engine upon driving a starter device until judgment is made that the engine enters a running state in the presence of judgment made that a specified startup initiating condition is established; and drive time limiting means for interrupting the automatic startup control means from driving the starter device when a duration time for the automatic startup control means to drive the starter device is measured upon which judgment is made that the duration time reaches a limit time;

wherein assume that a time for the starter device begins to be driven and the second cylinder discriminating means to complete the cylinder discrimination to cause the fuel injection and ignition to be initiated based on a relevant cylinder discriminating result to cause the engine to enter the running state when either the crank signal or the cam signal encounters a failure is Ts, the limit time is set to be longer than Ts in the presence of the failure in either the crank signal or the cam signal.

8. The engine control apparatus claimed in claim 7, further comprising:

limit time calculating means for calculating a value of the limit time based on specified information related to startability of the engine from among information relevant to information of the vehicle;

failure startup required time calculating means for calculating a value of Ts based on the specified information; and setting means operative such that when comparison is made between a calculated value of the limit time calculating means and a calculated value of the failure startup required time calculating means upon which the setting means sets the limit time to be the calculated value of the limit time calculating means, in the presence of the calculated value of the limit time calculating means larger than the calculated value of the failure startup required time calculating means, sets the limit time to be longer than the calculated value of the failure startup required time calculating means in the absence of the calculated value of the limit time calculating means larger than the calculated value of the failure startup required time calculating means.

9. The engine control apparatus claimed in claim 7, wherein:

the specified information has at least one of a battery voltage of the vehicle, an ambient temperature around the vehicle, a coolant water temperature of the engine and a temperature of lubricating oil of the engine.

10. A method of controlling a startup of a multi-cylinder engine, installed on a vehicle, which has a crank sensor for detecting rotation of a crankshaft of the engine, and a cam sensor for detecting rotation of a camshaft, the method comprising:

receiving a crank signal from the crank sensor representing the rotation of the crankshaft;

receiving a cam signal from the cam sensor representing the rotation of the camshaft;

executing cylinder discrimination based on the crank signal and the cam signal under a normal signal mode;

detecting failures in the crank signal and the cam signal, respectively;

discriminating whether or not a specified startup initiating condition is established for the engine;

interrupting the cylinder discrimination from being executed based on the crank signal and the cam signal in the presence of the failure in either the crank signal or the cam signal while executing the cylinder discrimination based on a normal one of the crank signal and the cam signal;

performing automatic startup control for cranking up the engine in the presence of the specified startup initiating condition by driving a starter device until the engine enters a running state;

measuring a duration time for which the automatic startup control is executed to drive the starter device and making judgment whether or not the duration time reaches a limit time;

interrupting the automatic startup control to prevent the starter device from being driven in the presence of the judgment that the duration time reaches the limit time; and setting the limit time to be longer than a preset reference time, assigned to a normal mode, in the presence of the failure in either the crank signal or the cam signal;

wherein fuel injection and ignition are executed for each cylinder of the engine based on the cylinder discrimination.

11. The method of controlling the startup of the multi-cylinder engine according to claim 10, wherein:

assume that in the presence of the failure in either the crank signal or the cam signal, a time, for which the starter device begins to be driven and the cylinder discrimination is completed to provide a cylinder discriminating result based on which the fuel injection and the ignition are initiated to cause the engine to enter the running state, is Ts, the limit time set to be longer than Ts in the presence of the failure in either the crank signal or the cam signal.

12. The method of controlling the startup of the multi-cylinder engine according to claim 10, wherein:

the limit time is set to a predetermined initial value until the cylinder discrimination is completed after which when the cylinder discrimination is completed, the limit time freshens to be set to a first time for a normal signal mode to be shorter than the initial value in the absence of the failure in either the crank signal or the cam signal and freshens to be set to a second time for a failure signal mode to be shorter than the initial value but to be longer than the first time for the normal signal mode, in the presence of the failure in either the crank signal or the cam signal.

13. The method of controlling the startup of the multi-cylinder engine according to claim 10, wherein:

the limit time is set to a time, which is equal to a value in which a given value is added to a setting time for a normal signal mode, or a time in which the setting time for the normal signal mode is made longer by a given rate.

14. The method of controlling the startup of the multi-cylinder engine according to claim 10, wherein:

the step of setting the limit time includes detecting specified information related to startability of the engine from among information relevant to the vehicle and setting the limit time to a value depending on a detection value representing the specified information such that the lower the startability of the engine represented by the detection value, the longer will be the limit time.

15. The method of controlling the startup of the multi-cylinder engine according to claim 14, wherein:

the specified information has at least one of a battery voltage of the vehicle, an ambient temperature around the vehicle, a coolant water temperature of the engine and a temperature of lubricating oil of the engine.

* * * * *